United States Patent
Clark

(10) Patent No.: US 12,472,565 B2
(45) Date of Patent: Nov. 18, 2025

(54) RATCHETING QUICK-ADJUST DRILLING JIG

(71) Applicant: Kreg Enterprises, Inc., Ankeny, IA (US)

(72) Inventor: Scott L. Clark, Boone, IA (US)

(73) Assignee: KREG ENTERPRISES, INC., Ankeny, IA (US)

( * ) Notice: Subject to any disclaimer, the term of this patent is extended or adjusted under 35 U.S.C. 154(b) by 885 days.

(21) Appl. No.: 17/578,602

(22) Filed: Jan. 19, 2022

(65) Prior Publication Data
US 2022/0134448 A1    May 5, 2022

Related U.S. Application Data

(60) Continuation of application No. 16/776,668, filed on Jan. 30, 2020, now Pat. No. 11,364,550, which is a
(Continued)

(51) Int. Cl.
*B23B 47/28* (2006.01)

(52) U.S. Cl.
CPC ........ *B23B 47/287* (2013.01); *B23B 2247/10* (2013.01); *B23B 2247/12* (2013.01); *Y10T 408/50* (2015.01); *Y10T 408/98* (2015.01)

(58) Field of Classification Search
CPC ..... B23B 47/28; B23B 47/287; B23B 47/288; B23B 2247/10; B23B 2247/12; B23B 2260/12; B23B 2260/004
See application file for complete search history.

(56) References Cited

U.S. PATENT DOCUMENTS

| | | | |
|---|---|---|---|
| 581,811 A * | 5/1897 | Coyle | B23B 47/287 408/103 |
| 626,488 A * | 6/1899 | Diehl | B23B 47/287 408/103 |

(Continued)

FOREIGN PATENT DOCUMENTS

| | | |
|---|---|---|
| AU | 2014295887 A1 | 2/2016 |
| AU | 2018101034 A4 | 8/2018 |

(Continued)

OTHER PUBLICATIONS

Rockier Jig It® Shelving Jig w/Self-Centering Bit. < https://www.rockler.com/fig-itreg-shelving-fig-fig-it174-shelving-fig-set-template-self-centering-bit>. Retrieved on Apr. 24, 2021. (Year: 2007).
(Continued)

*Primary Examiner* — Nicole N Ramos
(74) *Attorney, Agent, or Firm* — Christopher A. Proskey; BrownWinick Law Firm

(57) ABSTRACT

A quick adjust ratcheting pocket hole jig is presented. The pocket hole jig has a base with a removable upright connected thereto. A guide assembly is slidably received within the upright. Removable and replaceable side supports are connected to the base by way of a dove tail joint. Removable and replaceable adjustable stops are connected to the base by way of key holes. A clamp assembly is connected to the base having a handle portion and a clamp follower. The clamp follower has a ratcheting mechanism and a compressible plunger assembly. The clamp follower can quickly be adjusted using a button on the clamp follower that disengages the ratcheting member such that it can be quickly adjusted. When the handle is operated, it draws the clamp follower towards the upright and guide assembly compressing the spring loaded plunger assembly thereby quickly and tightly and adjustably holding a workpiece therebetween.

49 Claims, 25 Drawing Sheets

Related U.S. Application Data division of application No. 15/952,497, filed on Apr. 13, 2018, now abandoned, which is a continuation of application No. 14/275,402, filed on May 12, 2014, now Pat. No. 9,969,042.

(60) Provisional application No. 61/824,234, filed on May 16, 2013.

(56) References Cited

U.S. PATENT DOCUMENTS

| | | |
|---|---|---|
| 1,128,970 A | 2/1915 | Godefroy |
| 1,153,841 A | 9/1915 | Earle |
| 1,201,050 A | 10/1916 | Huff |
| 1,401,262 A | 12/1921 | Kranz |
| 1,576,463 A | 3/1926 | Pope |
| 1,890,664 A | 12/1932 | Alden |
| 1,919,900 A | 7/1933 | Moller |
| 2,181,746 A | 11/1939 | Siebrandt |
| 2,260,784 A | 10/1941 | Morton |
| 2,268,930 A | 1/1942 | Edwards |
| 2,396,739 A | 3/1946 | Edward |
| 2,436,941 A | 3/1948 | Sendoykas |
| 2,467,600 A | 4/1949 | Shipley |
| 2,490,718 A | 12/1949 | Stellin |
| 2,519,468 A | 8/1950 | Hengst |
| 2,527,968 A | 10/1950 | Albert |
| 2,552,400 A | 5/1951 | Brunia |
| 2,574,281 A | 11/1951 | Olson |
| 2,602,238 A | 7/1952 | Wellman |
| 2,674,907 A | 4/1954 | Zoll |
| 2,843,167 A | 7/1958 | Rushton |
| 2,866,512 A | 12/1958 | Padberg, Jr. |
| 3,116,124 A | 12/1963 | Eolkin |
| 3,263,531 A | 8/1966 | Sammons |
| 3,306,137 A | 2/1967 | Mele |
| 3,371,819 A | 3/1968 | Zeman |
| 3,386,318 A | 6/1968 | Pekarcik |
| 3,391,984 A | 7/1968 | Metcalf |
| 3,529,859 A | 9/1970 | Garczynski |
| 3,626,513 A | 12/1971 | Pytlak |
| 3,630,511 A | 12/1971 | Evans |
| 3,708,237 A | 1/1973 | Kruse |
| 3,735,972 A | 5/1973 | Blatt |
| 3,804,546 A | 4/1974 | Boyajian |
| 3,837,757 A | 9/1974 | Levine |
| 3,861,664 A | 1/1975 | Durkee |
| 3,898,412 A | 8/1975 | Robinson |
| 4,137,003 A | 1/1979 | Budoff |
| 4,176,989 A | 12/1979 | Wolff |
| 4,235,565 A | 11/1980 | Albano |
| 4,257,166 A | 3/1981 | Barker |
| 4,341,375 A | 7/1982 | Romanin |
| 4,385,755 A | 5/1983 | Mawer |
| 4,466,601 A | 8/1984 | Raines |
| 4,562,779 A | 1/1986 | Briggs |
| 4,594,032 A | 6/1986 | Warburg |
| 4,601,618 A | 7/1986 | McEldowney |
| 4,655,649 A | 4/1987 | Itzov |
| 4,715,125 A | 12/1987 | Livick |
| 4,730,959 A | 3/1988 | Aerni |
| 4,747,588 A | 5/1988 | Dillhoff |
| 4,759,666 A | 7/1988 | Grab |
| 4,809,424 A | 3/1989 | Bianchi |
| 4,842,453 A | 6/1989 | Raines |
| 4,848,356 A | 7/1989 | Nakamura |
| 4,904,130 A | 2/1990 | Gorman |
| 4,938,797 A | 7/1990 | Hasslin |
| 4,955,766 A | 9/1990 | Sommerfeld |
| 5,056,966 A | 10/1991 | Lee |
| 5,076,742 A | 12/1991 | Lee |
| 5,098,235 A | 3/1992 | Svetlik |
| 5,121,803 A | 6/1992 | Hartmann |
| 5,163,792 A | 11/1992 | Slavik |
| 5,173,234 A | 12/1992 | Figuereo |
| 5,238,336 A | 8/1993 | Sanders |
| 5,322,396 A | 6/1994 | Blacker |
| 5,332,162 A | 7/1994 | Peck |
| 5,367,111 A | 11/1994 | Ohsumi |
| 5,617,909 A | 4/1997 | Duginske |
| 5,639,192 A | 6/1997 | Chen |
| 5,676,500 A | 10/1997 | Sommerfeld |
| 5,722,648 A | 3/1998 | Groll |
| 5,788,303 A | 8/1998 | Chia-Hsiang |
| 5,791,835 A | 8/1998 | Chiang |
| 5,807,036 A | 9/1998 | Lostlen |
| 5,855,285 A | 1/1999 | Laird |
| 5,858,441 A | 1/1999 | Reddy |
| 5,916,616 A | 6/1999 | Kuwada |
| 5,954,461 A | 9/1999 | Lemieux |
| 5,982,267 A | 11/1999 | Locht |
| 5,998,764 A | 12/1999 | Mathieu |
| 6,129,673 A | 10/2000 | Fraden |
| 6,149,597 A | 11/2000 | Kamiyama |
| 6,200,075 B1 | 3/2001 | Gaskin |
| 6,254,320 B1 | 7/2001 | Weinstein |
| 6,266,667 B1 | 7/2001 | Olsson |
| 6,267,619 B1 | 7/2001 | Nishioka |
| 6,272,556 B1 | 8/2001 | Gish |
| 6,283,685 B1 | 9/2001 | Lemieux |
| 6,394,712 B1 | 5/2002 | Weinstein |
| 6,413,022 B1 | 7/2002 | Sarh |
| 6,448,752 B1 | 9/2002 | Umemoto |
| 6,481,937 B1 | 11/2002 | Sommerfeld |
| 6,499,448 B2 | 12/2002 | Yildirim |
| 6,554,665 B1 | 4/2003 | Kaneko |
| 6,599,064 B1 | 7/2003 | Robinson |
| 6,622,997 B2 | 9/2003 | Emerson |
| 6,637,988 B1 | 10/2003 | Park |
| 6,659,695 B2 | 12/2003 | Park |
| 6,664,755 B1 | 12/2003 | Huang |
| 6,664,756 B2 | 12/2003 | Horng |
| 6,726,411 B2 | 4/2004 | Sommerfeld |
| 6,729,811 B2 | 5/2004 | Kamphuis |
| 6,827,156 B1 | 12/2004 | Hsiao |
| 6,851,900 B2 | 2/2005 | Tillemans |
| D503,415 S | 3/2005 | Dembicks |
| 6,876,384 B1 | 4/2005 | Hubina |
| 6,905,291 B2 | 6/2005 | Day |
| 6,947,476 B2 | 9/2005 | Song |
| 6,955,508 B1 | 10/2005 | Radcliffe |
| 6,956,666 B2 | 10/2005 | Tanaka |
| D528,930 S | 9/2006 | Degen |
| 7,101,123 B1 | 9/2006 | Weinstein |
| 7,134,814 B1 | 11/2006 | Park |
| 7,210,880 B2 | 5/2007 | Snider |
| D567,269 S | 4/2008 | Netzler |
| 7,374,373 B1 | 5/2008 | Park |
| 7,464,737 B2 | 12/2008 | Duginske |
| 7,484,914 B1 | 2/2009 | Weinstein |
| 7,595,725 B1 | 9/2009 | Joseph |
| 7,597,513 B2 | 10/2009 | Chiang |
| 7,641,424 B1 | 1/2010 | Sommerfeld |
| 7,641,425 B2 | 1/2010 | Sommerfeld |
| 7,658,422 B2 | 2/2010 | Carr |
| 7,668,712 B2 | 2/2010 | Wang |
| 7,670,089 B2 | 3/2010 | Chiang |
| 7,686,178 B2 | 3/2010 | Grant |
| 7,742,772 B2 | 6/2010 | Twitchell, Jr. |
| 7,798,750 B2 | 9/2010 | Clark |
| 7,837,522 B1 | 11/2010 | Hoover |
| 7,962,354 B2 | 6/2011 | Liew |
| 7,962,456 B2 | 6/2011 | Magruder |
| 7,967,534 B2 | 6/2011 | McDaniel |
| 7,991,553 B2 | 8/2011 | Alumbaugh |
| 8,052,358 B2 | 11/2011 | McDaniel |
| 8,083,443 B1 | 12/2011 | Circosta |
| D651,885 S | 1/2012 | Banasik |
| 8,087,853 B2 | 1/2012 | Stukuls |
| 8,128,321 B2 | 3/2012 | Quinn |
| 8,147,651 B2 | 4/2012 | Dykstra |
| 8,231,313 B2 | 7/2012 | Sommerfeld |
| 8,337,368 B2 | 12/2012 | Weller |
| 8,425,442 B2 | 4/2013 | Lundberg |

(56) References Cited

U.S. PATENT DOCUMENTS

| | | |
|---|---|---|
| 8,485,484 B2 | 7/2013 | Kronner |
| 8,523,160 B2 | 9/2013 | Wilturner |
| 8,545,715 B1 | 10/2013 | Wang |
| 8,654,772 B2 | 2/2014 | Hadi Salim |
| 8,840,345 B1 | 9/2014 | Park |
| 8,922,144 B2 | 12/2014 | Weslati |
| 9,292,791 B2 | 3/2016 | Lu |
| 9,487,776 B2 | 11/2016 | List |
| 9,682,430 B2 | 6/2017 | Clark |
| 9,782,837 B2 | 10/2017 | Pelkey |
| D809,032 S | 1/2018 | Cummings |
| D809,578 S | 2/2018 | Cummings |
| 9,894,251 B2 | 2/2018 | Hunt |
| 9,951,456 B2 | 4/2018 | Bottger |
| 9,969,011 B1 | 5/2018 | Marusiak |
| 9,969,042 B2 | 5/2018 | Clark |
| 10,022,808 B2 | 7/2018 | Chang |
| 10,144,068 B1 | 12/2018 | Poole |
| 10,173,269 B2 | 1/2019 | Cattaneo |
| 10,286,458 B2 | 5/2019 | Brigham |
| 10,315,295 B2 | 6/2019 | Vandenberg |
| 10,343,222 B2 | 7/2019 | Schwagerle |
| 10,357,831 B2 | 7/2019 | Evatt |
| 10,646,933 B2 | 5/2020 | Duginske |
| 11,796,298 B2 | 10/2023 | Chang |
| 11,865,625 B2 | 1/2024 | Evatt |
| 11,883,930 B2 | 1/2024 | Baker |
| 2001/0042429 A1 | 11/2001 | Brunson |
| 2002/0150434 A1 | 10/2002 | Sommerfeld |
| 2002/0194971 A1 | 12/2002 | Park |
| 2003/0123941 A1 | 7/2003 | Emerson |
| 2004/0141821 A1 | 7/2004 | Otten |
| 2004/0164503 A1 | 8/2004 | Fan-Chiang |
| 2004/0253065 A1 | 12/2004 | Davis |
| 2005/0089381 A1 | 4/2005 | Liu |
| 2006/0108729 A1 | 5/2006 | Siegel |
| 2006/0228180 A1 | 10/2006 | Sommerfeld |
| 2007/0201961 A1 | 8/2007 | Chiang |
| 2007/0280795 A1 | 12/2007 | McDaniel |
| 2007/0280797 A1 | 12/2007 | McDaniel |
| 2008/0075546 A1 | 3/2008 | Lin |
| 2008/0099101 A1 | 5/2008 | Chiang |
| 2008/0187404 A1 | 8/2008 | Chiang |
| 2008/0219786 A1 | 9/2008 | Sommerfeld |
| 2008/0219788 A1 | 9/2008 | Sommerfeld |
| 2008/0226406 A1 | 9/2008 | Chiang |
| 2009/0053002 A1 | 2/2009 | Kirby |
| 2010/0084534 A1 | 4/2010 | Greenwood |
| 2011/0150587 A1 | 6/2011 | Stukuls |
| 2012/0051865 A1 | 3/2012 | Liu |
| 2016/0158850 A1 | 6/2016 | Fisher |
| 2017/0087644 A1 | 3/2017 | Pelkey |
| 2018/0071835 A1 | 3/2018 | Poole |
| 2018/0141133 A1 | 5/2018 | Clark |
| 2018/0185930 A1 | 7/2018 | Duginske |
| 2018/0214959 A1 | 8/2018 | Evatt |
| 2018/0214960 A1 | 8/2018 | Evatt |
| 2018/0290217 A1 | 10/2018 | Asimakis |
| 2018/0339421 A1 | 11/2018 | Yates |
| 2018/0345385 A1 | 12/2018 | Yates |
| 2019/0015903 A1 | 1/2019 | Schleicher |
| 2019/0026360 A1 | 1/2019 | Carroll |
| 2019/0030619 A1 | 1/2019 | Thackery |
| 2019/0047058 A1 | 2/2019 | Pikarski |
| 2019/0054547 A1 | 2/2019 | Pikarski |
| 2019/0111499 A1 | 4/2019 | Evatt |
| 2019/0176247 A1 | 6/2019 | Chang |
| 2019/0217402 A1 | 7/2019 | Brigham |
| 2023/0294231 A1 | 9/2023 | Partington |
| 2023/0302549 A1 | 9/2023 | Liu |
| 2024/0024966 A1 | 1/2024 | Liao |
| 2024/0058874 A1 | 2/2024 | Fauss |
| 2024/0066608 A1 | 2/2024 | Bleyer |

FOREIGN PATENT DOCUMENTS

| | | |
|---|---|---|
| CA | 2506924 C | 7/2012 |
| CA | 3012668 A1 | 1/2019 |
| DE | 8613606 U1 | 7/1986 |
| DE | 4338596 A1 | 5/1994 |
| DE | 102004025880 B3 | 11/2005 |
| DE | 102004023343 A1 | 12/2005 |
| DE | 102004026037 A1 | 12/2005 |
| DE | 202006005977 U1 | 8/2006 |
| DE | 60125047 D1 | 1/2007 |
| DE | 202012103274 U1 | 9/2012 |
| DE | 202017101885 U1 | 5/2017 |
| DE | 202018104374 U1 | 9/2018 |
| DE | 102017115668 A1 | 1/2019 |
| EP | 1311364 A1 | 5/2003 |
| EP | 1595627 A2 | 11/2005 |
| EP | 1712315 A1 | 10/2006 |
| EP | 2223762 A1 | 9/2010 |
| EP | 2512763 A2 | 10/2012 |
| EP | 3027364 A1 | 6/2016 |
| EP | 3391984 A1 | 10/2018 |
| EP | 3444057 A1 | 2/2019 |
| EP | 3444058 A1 | 2/2019 |
| EP | 3446817 A1 | 2/2019 |
| FR | 2360370 A1 | 3/1978 |
| GB | 2299774 A | 10/1996 |
| GB | 2346573 A | 8/2000 |
| GB | 2496473 A | 5/2013 |
| GB | 201806455 | 6/2018 |
| GB | 2564944 A | 1/2019 |
| GB | 2567053 A | 4/2019 |
| GB | 2567056 A | 4/2019 |

OTHER PUBLICATIONS

Paul Mayer, Jig-It® Shelving Jig From Rockler. <https://www.wwgoa.com/article/fig-it-sheiving-fig-from-rockler/>, Retrieved on Apr. 24, 2021. (Year: 2010).

Jig It® Shelving Jig & 5mm Bit Set—Amazon.com. <https://www.amazon.com/JIG-Shelving-Jig-5mm-Bit/dp/B001BBAK9S#customerReviews>. Retrieved on Apr. 24, 2021. (Year: 2011).

Milescraft, "CROWN$% Manual" www.milescraft.com, 2007 (8 pgs).

Cut-N-Crown, Inc., "Cut-N-Crown—All Products", http://www.cutncrown.com/all_products.php 2007 (4 pgs).

* cited by examiner

RATCHETING QUICK-ADJUST DRILLING JIG

CROSS REFERENCE TO RELATED APPLICATION

This application is a continuation of U.S. Utility application Ser. No. 16/776,668 which was filed on Jan. 30, 2020, which is a division of U.S. Utility application Ser. No. 15/952,497 which was filed on Apr. 13, 2018, which is a continuation of U.S. Utility application Ser. No. 14/275,402 which was filed on May 12, 2014, which claims the benefit of U.S. Provisional Application No. 61/824,234 which was filed on May 16, 2013, the contents of each of which are herein incorporated in their entireties.

FIELD OF THE INVENTION

This invention relates generally to holding systems. More specifically, and without limitation, this invention relates to adjustable holding systems, such as jigs, and methods of using same.

BACKGROUND OF INVENTION

Pocket hole wood joinery involves joining boards by inserting a fastener at an angle through the edge of one board into the other. Such joints are commonly used for face frames, cabinet boxes, leg-to-rail joinery in chairs and tables, and so forth. Drill guides or jigs are used to drill the holes through which the fasteners or pocket screws are inserted into the adjoining workpiece.

Typical jigs or pocket hole devices require manual, complex and time consuming adjustments to set the jig to properly tighten on various sized workpieces. The need to make these adjustments increase the difficulty of using the prior art jigs and also increase the amount of time it takes to use prior art jigs. In addition, the clamping mechanism of typical jigs or pocket hole devices require the user to meet a certain level of precision to adjust the jig to achieve the right clamping tension. If the jig is not precisely adjusted the workpiece will be too loose within the jig which leads to movement of the workpiece during use and causes poor quality pocket holes. Or alternatively, if the jig is too tight the clamping mechanism will not fully close on the workpiece which requires readjustment of the clamping mechanism before it can be used. Alternatively, if the jig is too tight, this could cause damage to the workpiece (such as markings) or alternatively damage the jig itself.

For the reasons stated above, and for other reasons stated below which will become apparent to those skilled in the art upon reading and understanding the specification, there is a need in the art for an improved adjustable holding system.

Thus, an object of the invention is to provide a pocket hole jig that improves upon the present state of the art.

Another object of the invention is to provide a pocket hole jig that quickly adjusts to various sized workpieces.

Yet another object of the invention is to provide a pocket hole jig that is easy to use.

Another object of the invention is to provide a pocket hole jig that does not require complex or precise adjustments to be used on various sized workpieces.

Yet another object of the invention is to provide a pocket hole jig that is quick to use.

Another object of the invention is to provide a pocket hole jig that is inexpensive to produce.

Yet another object of the invention is to provide a pocket hole jig that is durable and rigid and robust in design, function and use.

Another object of the invention is to provide a pocket hole jig that presents an improved manner and method of setting the length of pocket hole stepped drill bits.

Yet another object of the invention is to provide a pocket hole jig that presents the ability to remove and replace the upright.

Yet another object of the invention is to provide a pocket hole jig that provides storage for parts, pieces and tools.

Another object of the invention is to provide a pocket hole jig that has removable supports.

Yet another object of the invention is to provide a pocket hole jig that has removable stops.

Another object of the invention is to provide a pocket hole jig that provides improved dust collection.

These and other objects, features, or advantages of the present invention will become apparent from the specification and claims.

SUMMARY OF THE INVENTION

A quick adjust ratcheting pocket hole jig is presented. The pocket hole jig has a base with a removable upright connected thereto. A guide assembly is slidably received within the upright. Removable and replaceable side supports are connected to the base by way of a dove tail joint. Removable and replaceable adjustable stops are connected to the base by way of key holes. A clamp assembly is connected to the base having a handle portion and a clamp follower. The clamp follower has a ratcheting mechanism and a compressible plunger assembly. The clamp follower can quickly be adjusted using a button on the clamp follower that disengages the ratcheting member such that it can be quickly adjusted. When the handle is operated, it draws the clamp follower towards the upright and guide assembly compressing the spring loaded plunger assembly thereby quickly and tightly and adjustably holding a workpiece therebetween.

DETAILED DESCRIPTION OF THE INVENTION

Figure 1:
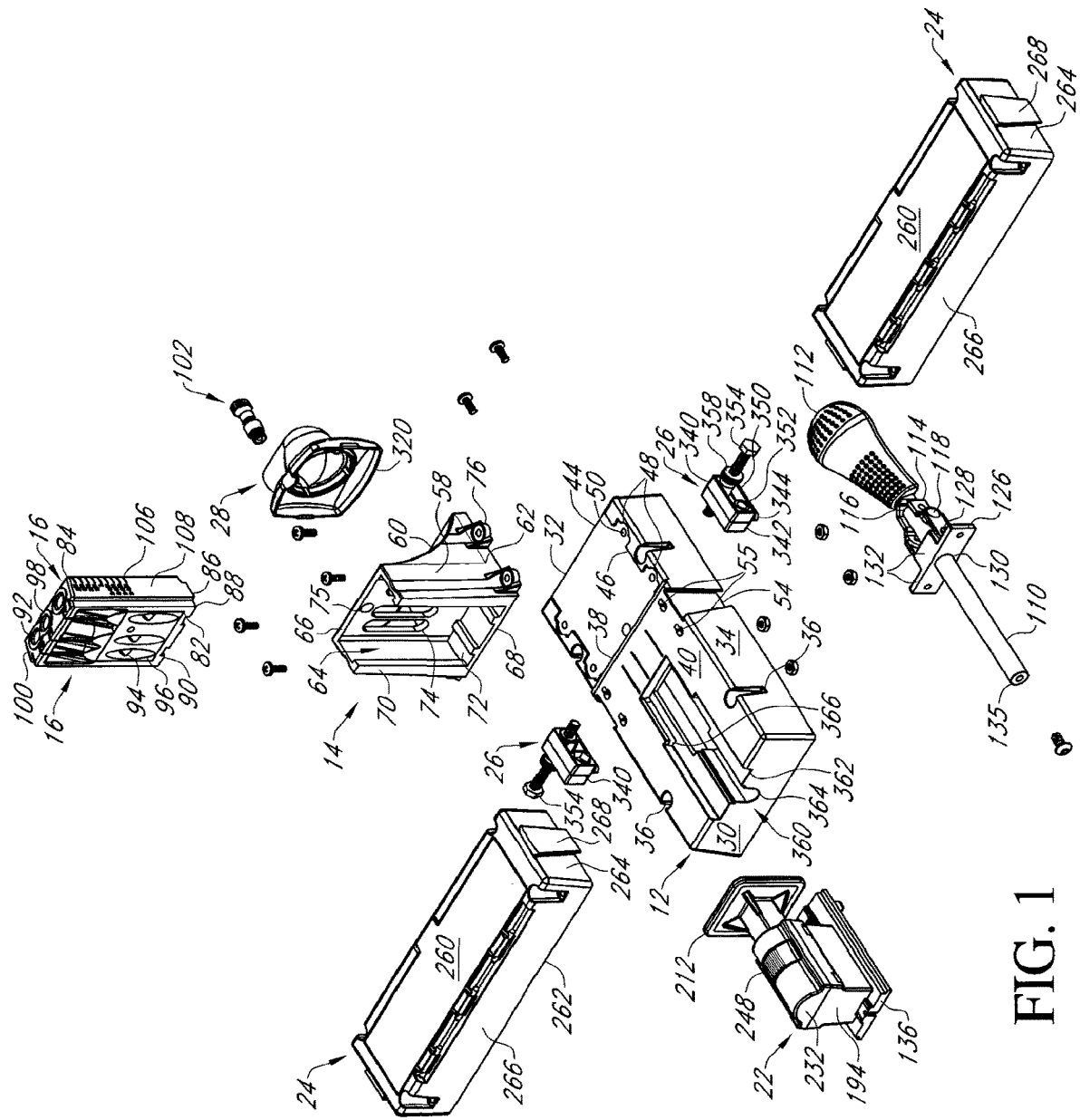
FIG. 1 is a perspective exploded view a quick adjust ratcheting pocket hole jig.
Figure 2:
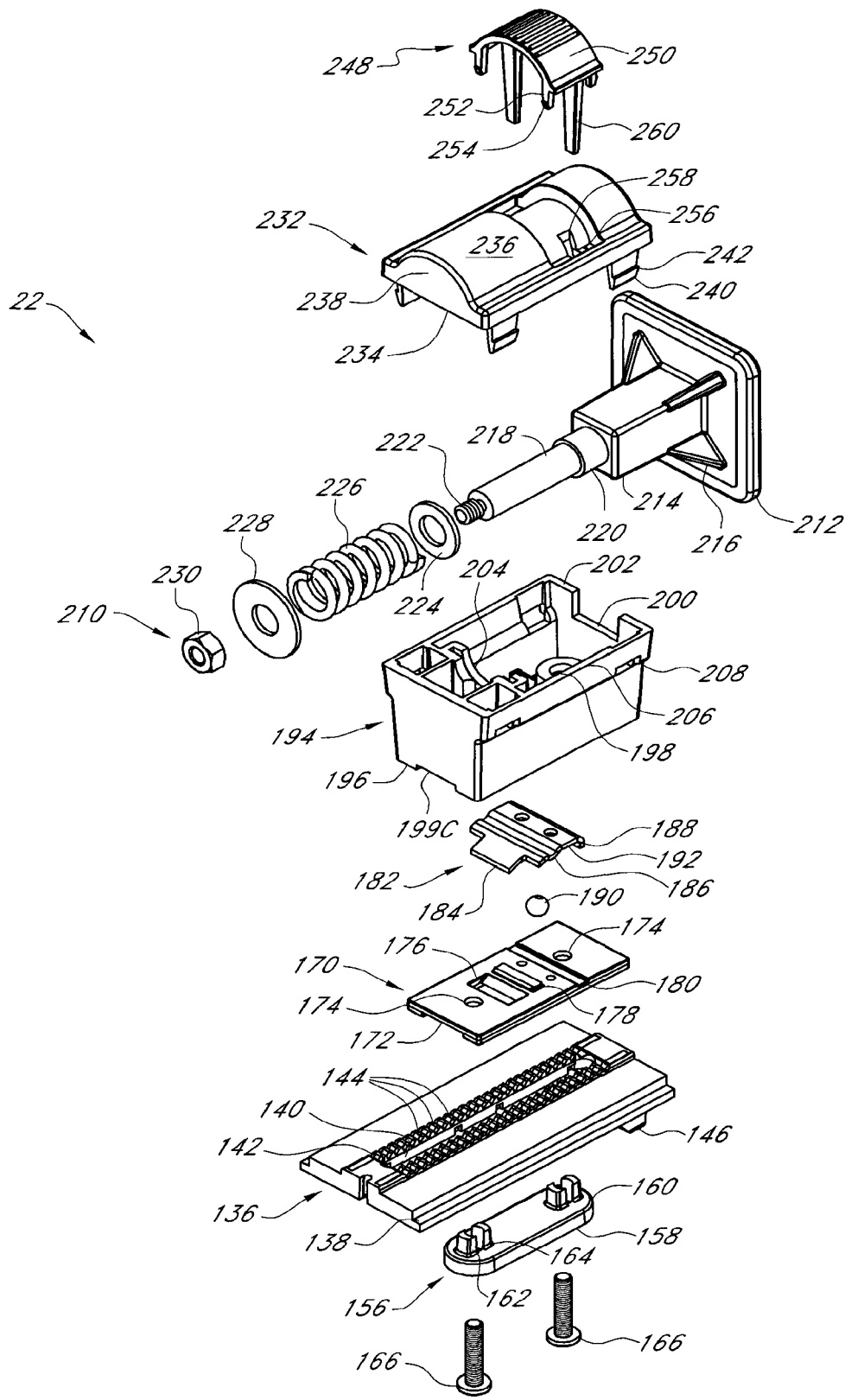
FIG. 2 is a perspective exploded view of a clamp follower of the quick adjust ratcheting pocket hole jig.
Figure 3:
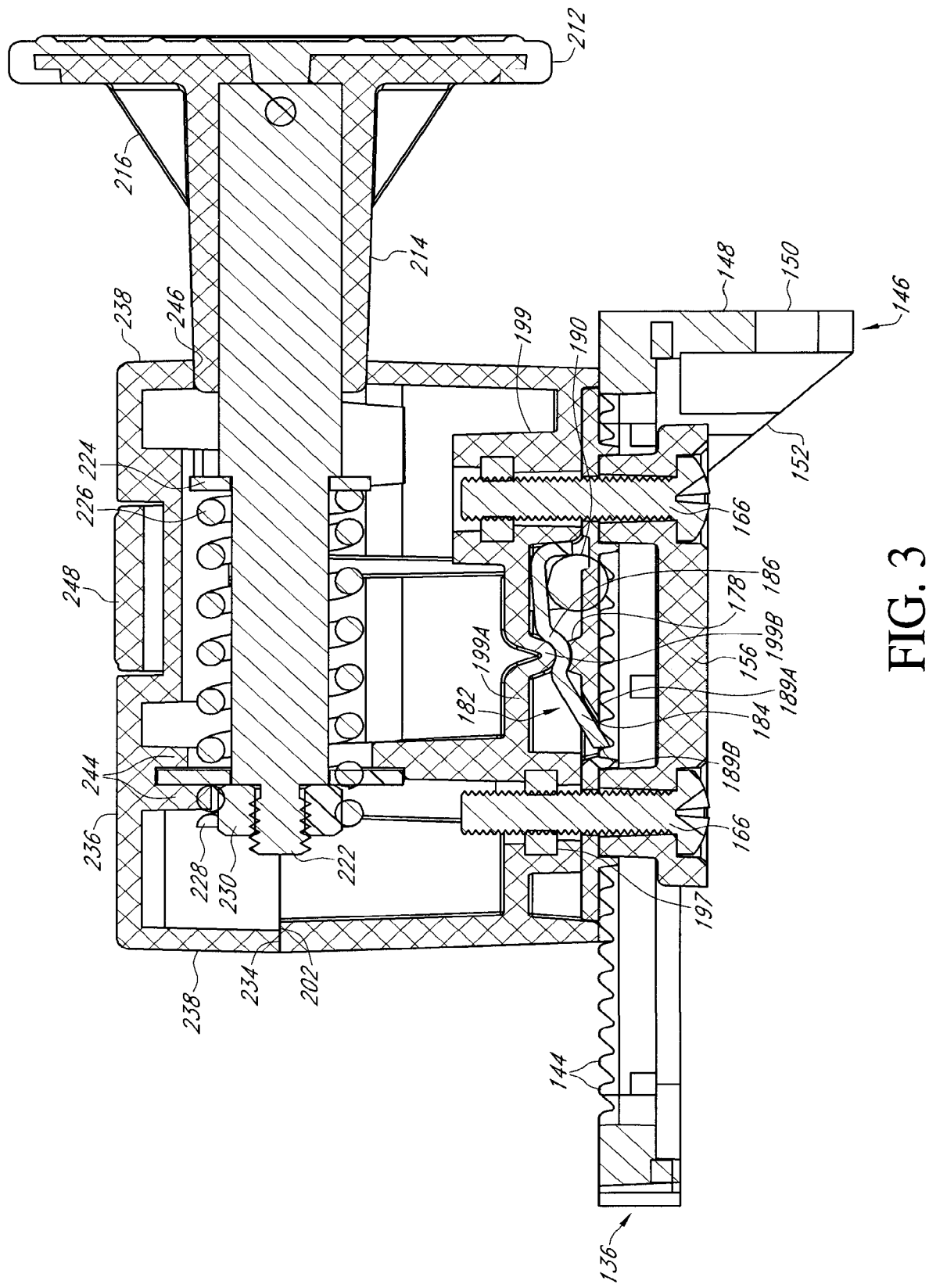
FIG. 3 is an elevation cut-away view of a clamp follower of the quick adjust ratcheting pocket hole jig.
Figure 4:
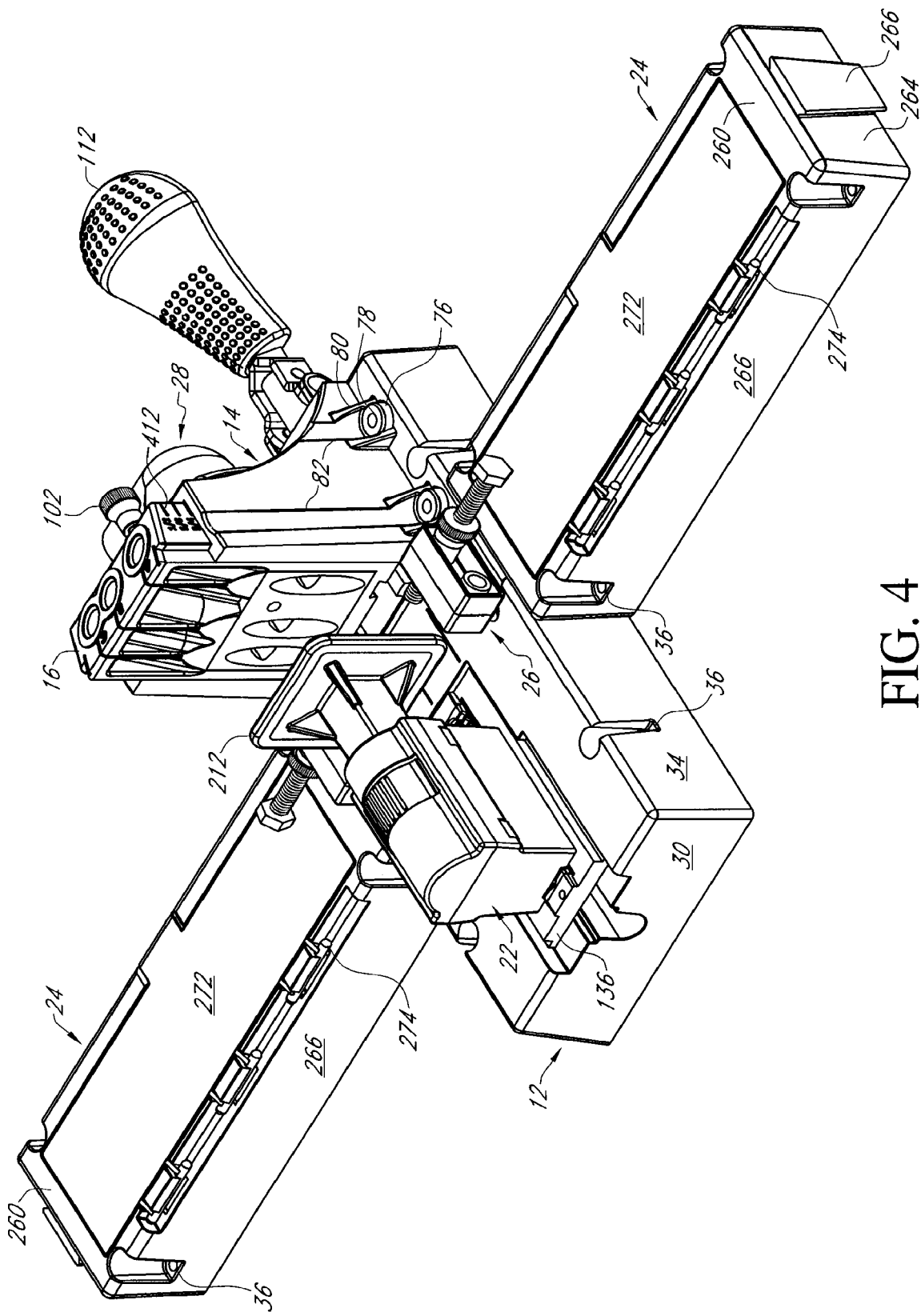
FIG. 4 is a perspective exploded view of an assembled quick adjust ratcheting pocket hole jig showing the adjustable stops installed on the base and the side supports 24 installed on the base.
Figure 5:
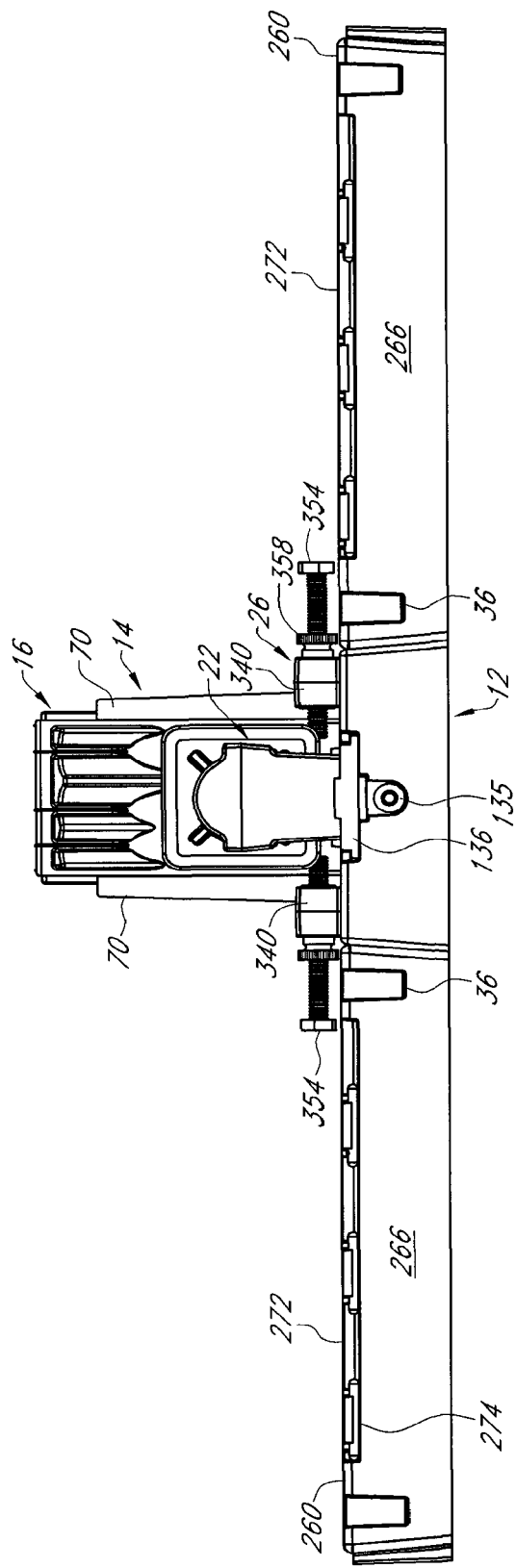
FIG. 5 is an elevation view of the front of the quick adjust ratcheting pocket hole jig.
Figure 6:
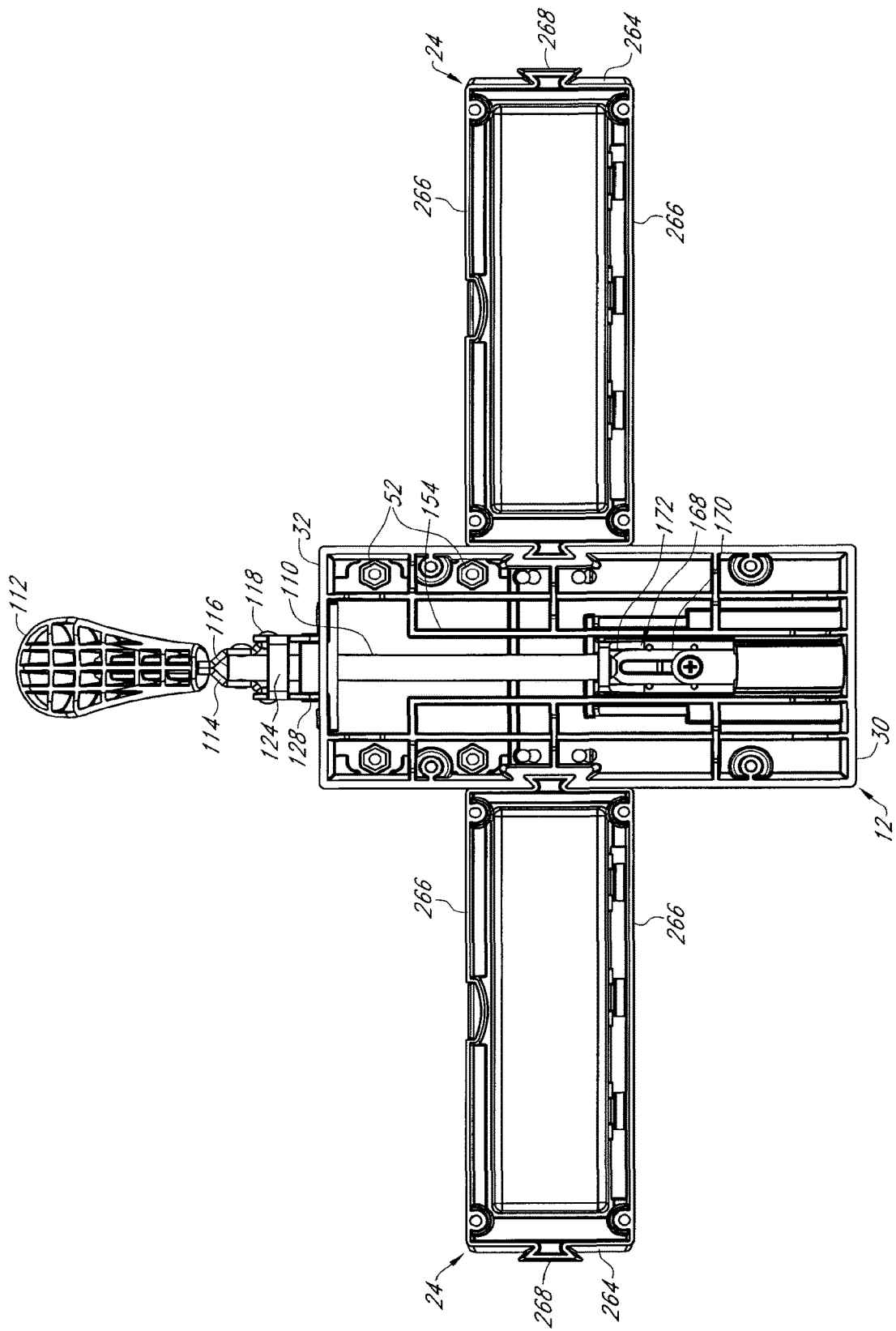
FIG. 6 is an elevation view of the bottom of the quick adjust ratcheting pocket hole jig.
Figure 7:
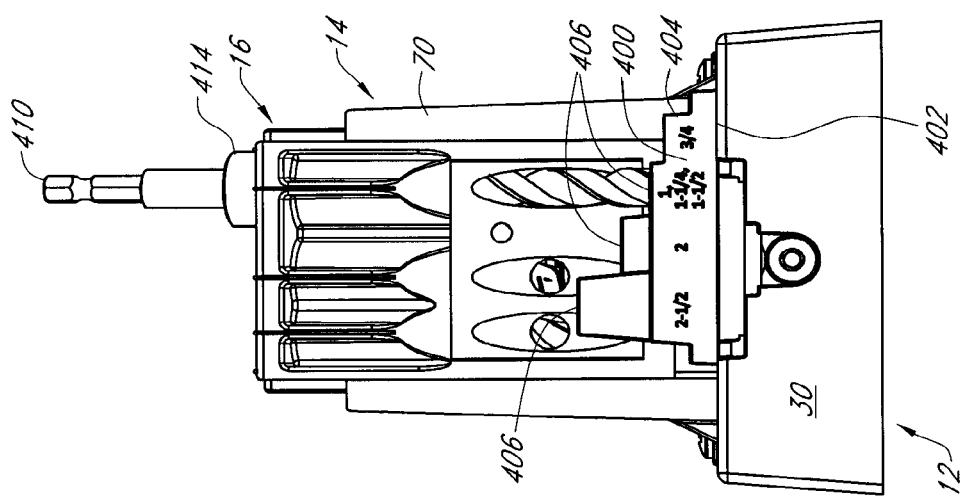
FIG. 7 is an elevation view of the front of the quick adjust ratcheting pocket hole jig with a drill setting guide positioned on the base and a stepped drill bit in the guide assembly that engages the drill setting guide so as to set the position of the stop collar on the stepped drill bit (the clamp follower is removed from this view to show the drill setting guide).
Figure 8:
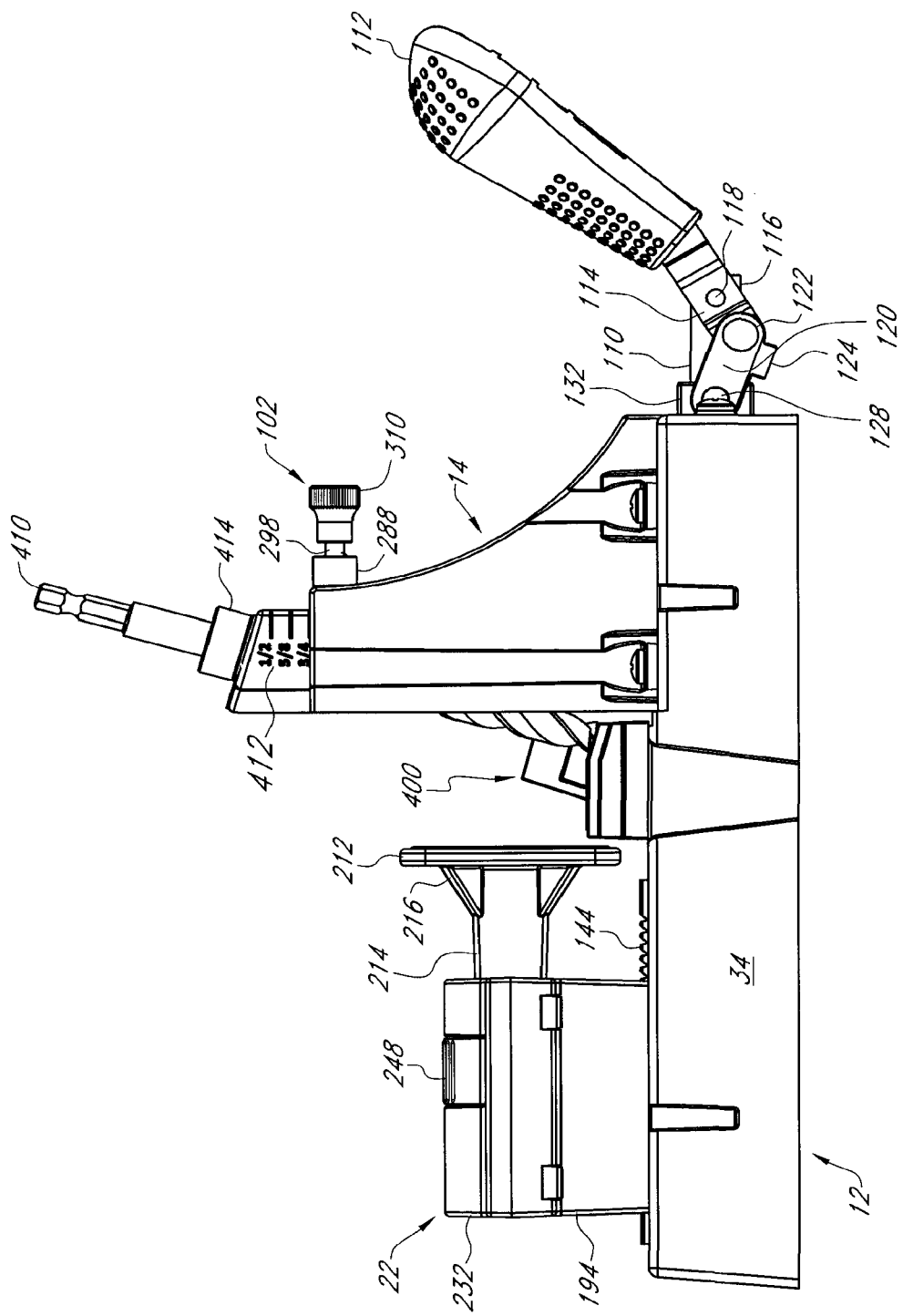
FIG. 8 is an elevation view of the side of the quick adjust ratcheting pocket hole jig with a drill setting guide positioned on the base and a stepped drill bit in the guide assembly that engages the drill setting guide so as to set the position of the stop collar on the stepped drill bit.
Figure 9:
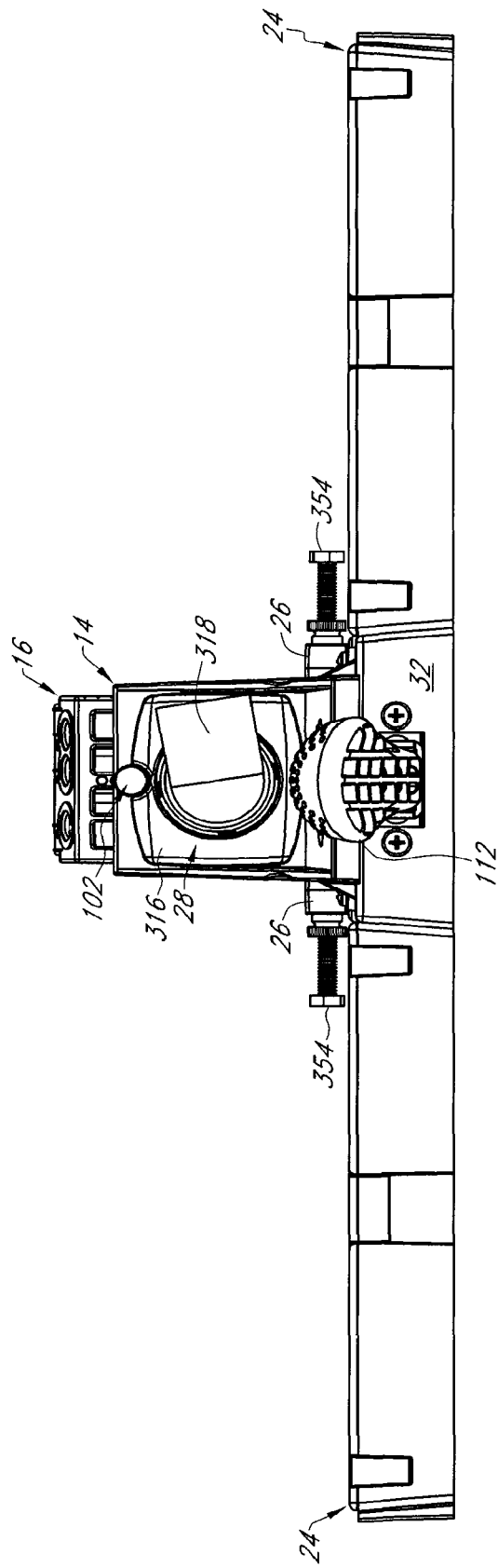
FIG. 9 is an elevation view of the rear of the quick adjust ratcheting pocket hole jig, with the dust catcher installed.
Figure 10:
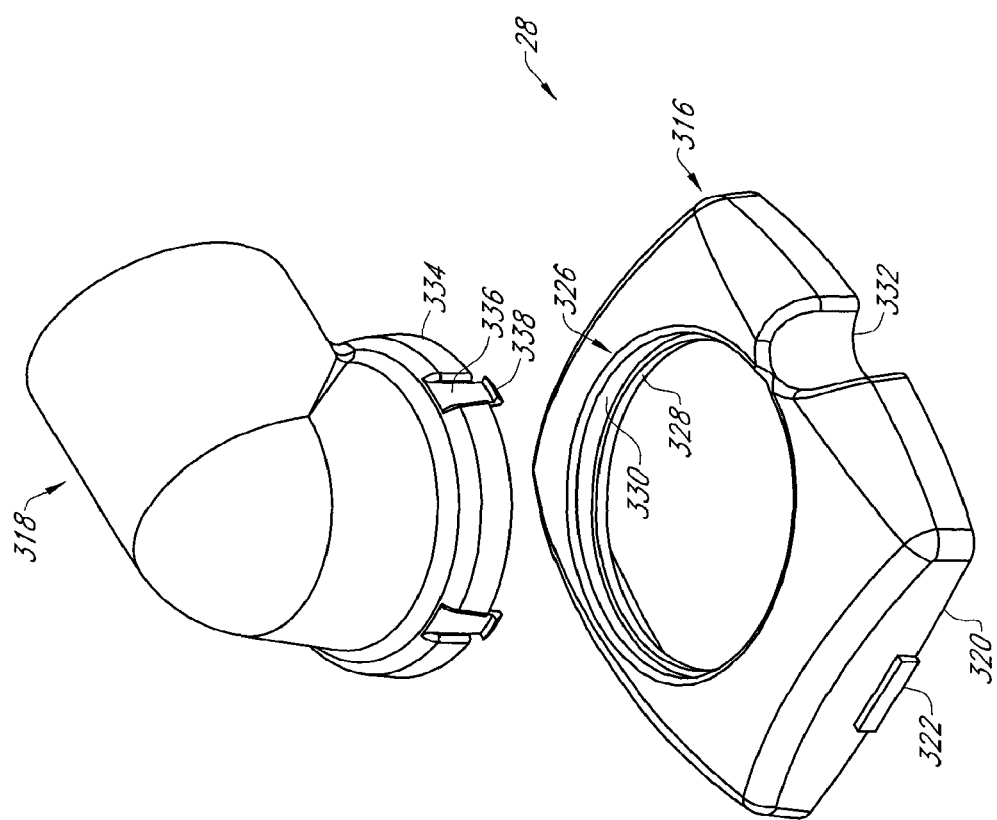
FIG. 10 is a perspective exploded view of the dust catcher of the quick adjust ratcheting pocket hole jig.
Figure 11:
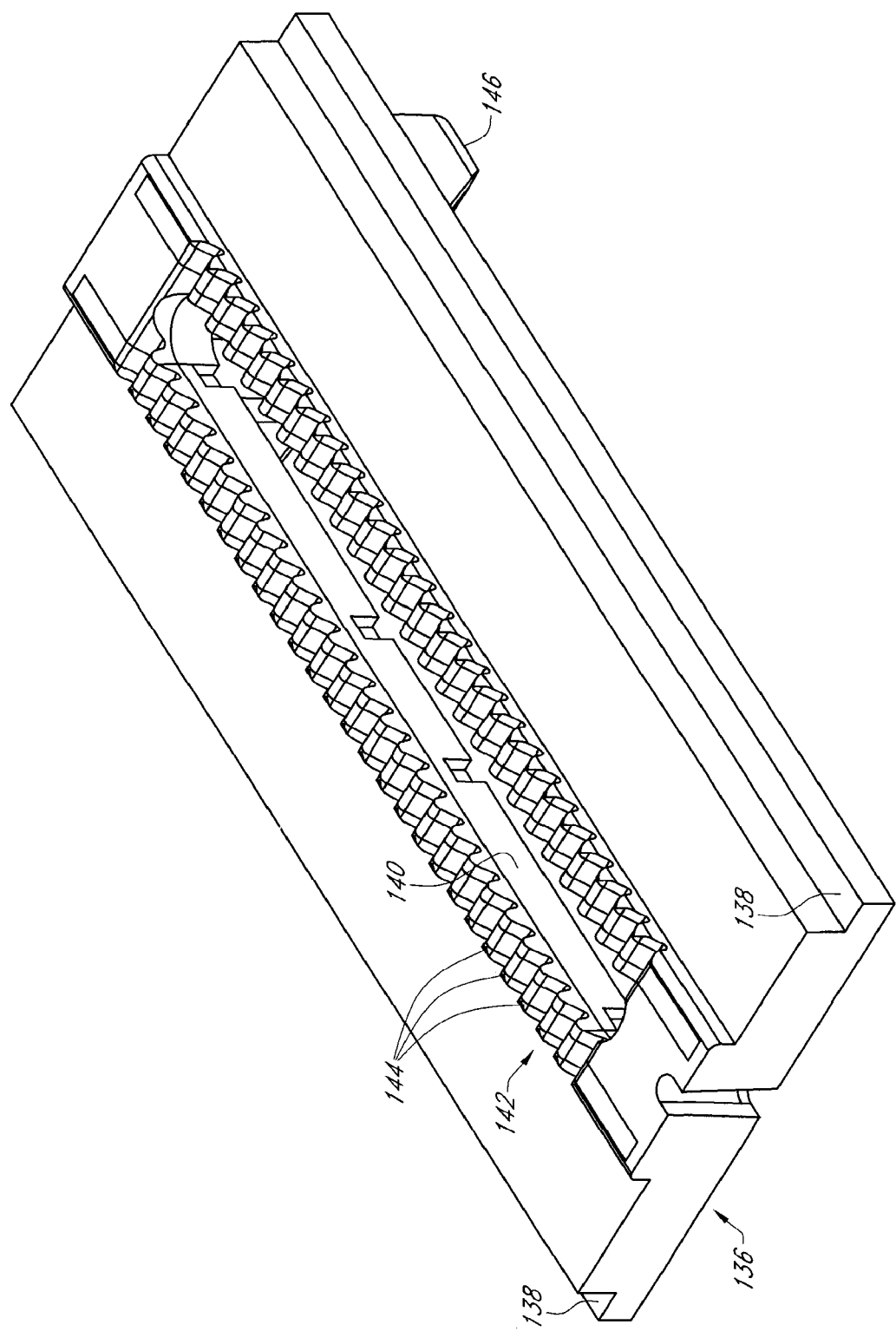
FIG. 11 is a perspective view of the ratchet plate of the quick adjust ratcheting pocket hole jig.
Figure 12:
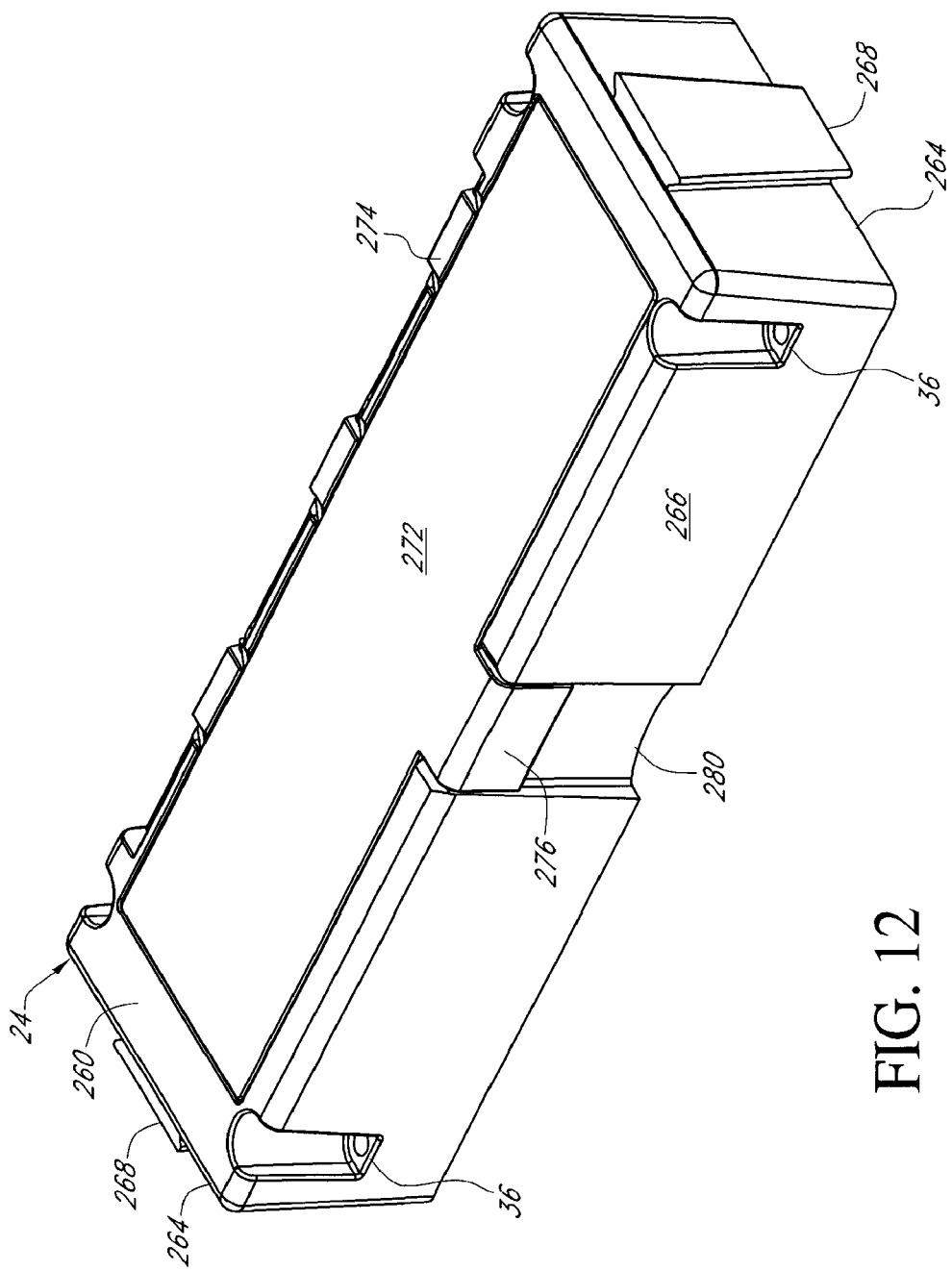
FIG. 12 is a perspective view of a side support of the quick adjust ratcheting pocket hole jig.
Figure 13:
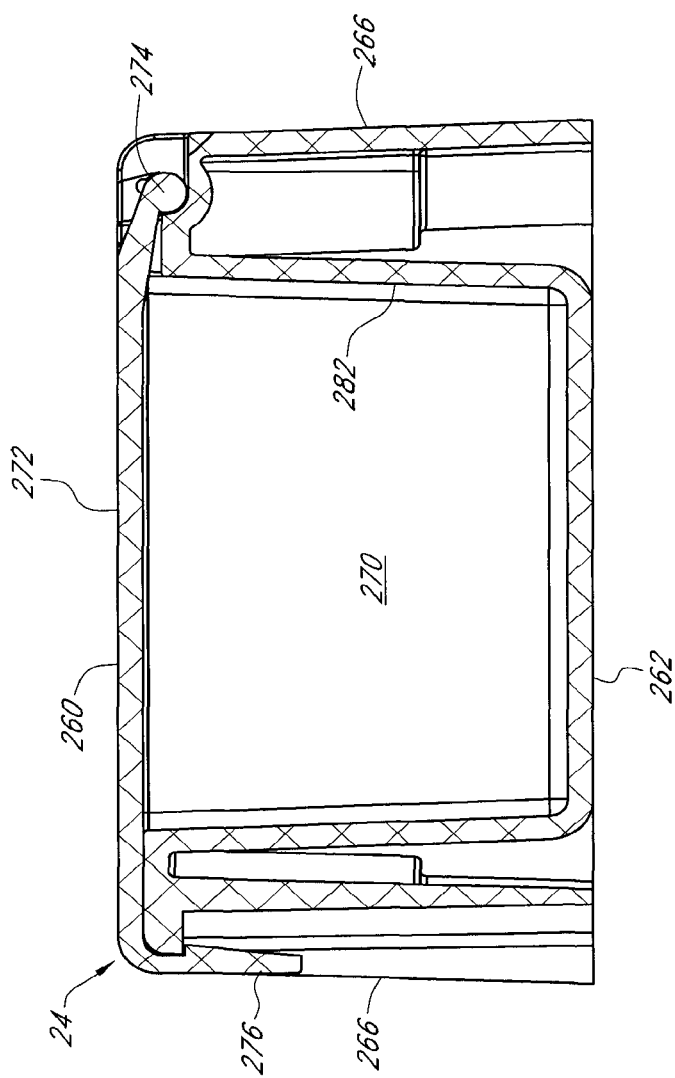
FIG. 13 is an elevation cut-away view of an end of the side support of the quick adjust ratcheting pocket hole jig.
Figure 14:
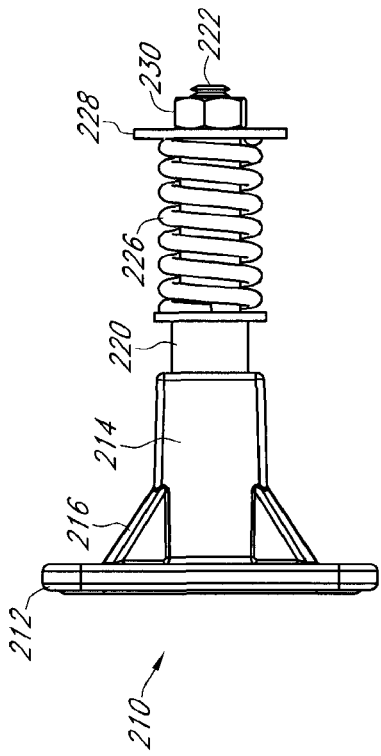
FIG. 14 is an elevation side view of a plunger assembly of the quick adjust ratcheting pocket hole jig.
Figure 15:
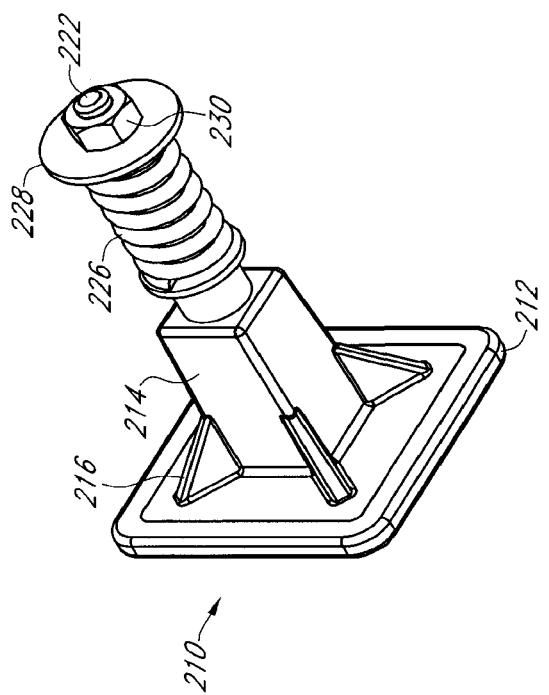
FIG. 15 is a perspective side view of a plunger assembly of the quick adjust ratcheting pocket hole jig.
Figure 16:
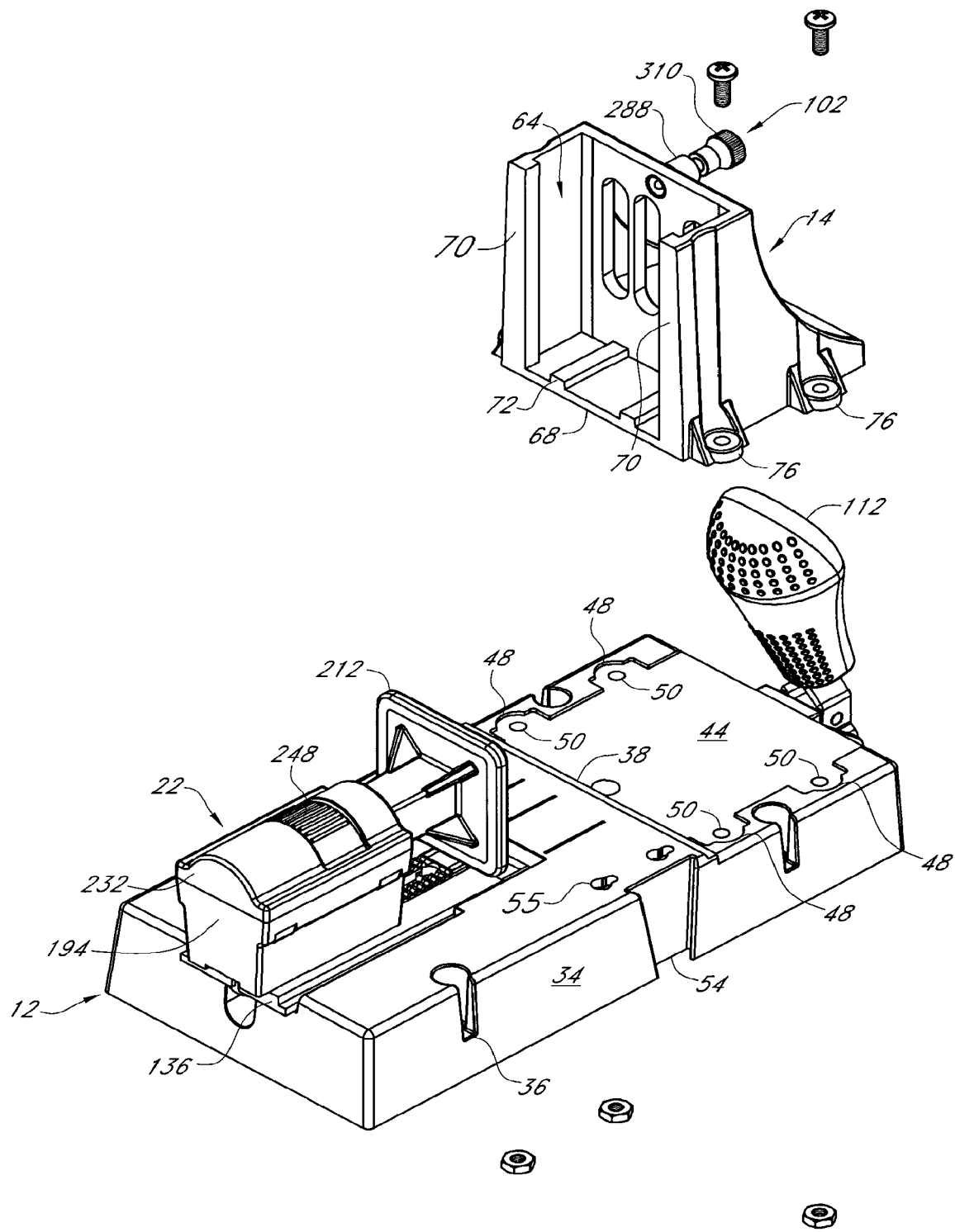
FIG. 16 is a perspective exploded view of the quick adjust ratcheting pocket hole jig with the upright removed.
Figure 17:
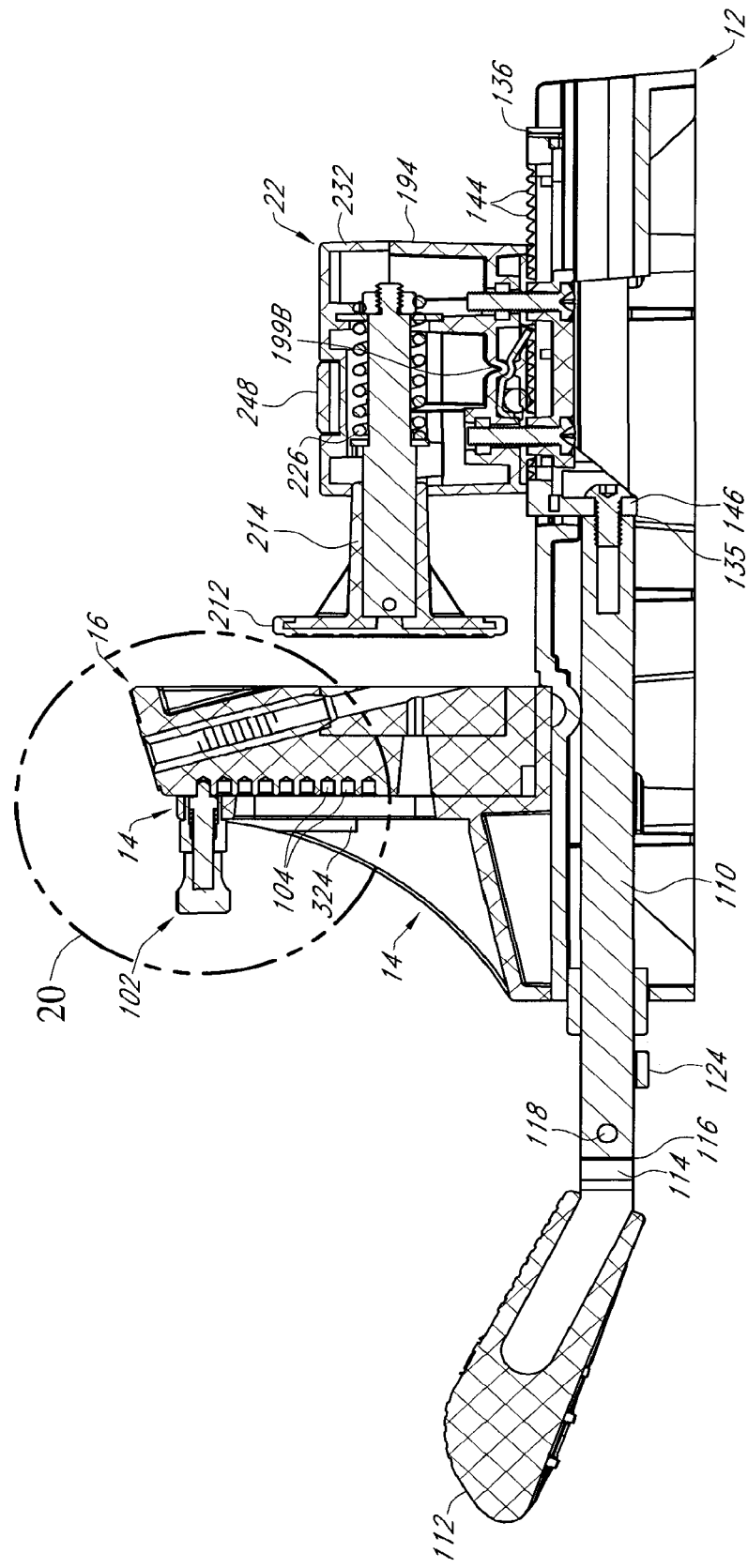
FIG. 17 is an elevation cut-away side view of the quick adjust ratcheting pocket hole jig, with the jig in a clamping position.
Figure 18:
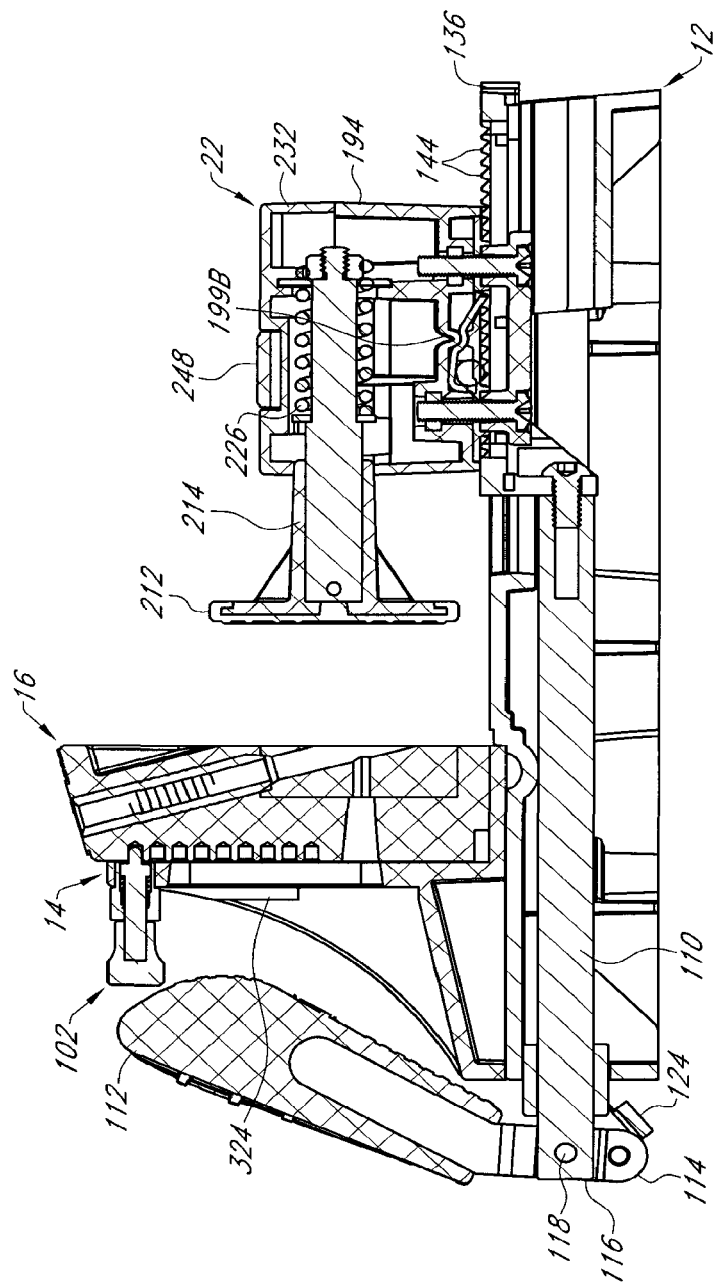
FIG. 18 is an elevation cut-away side view of the quick adjust ratcheting pocket hole jig, with the jig in a non-clamping position.
Figure 19:
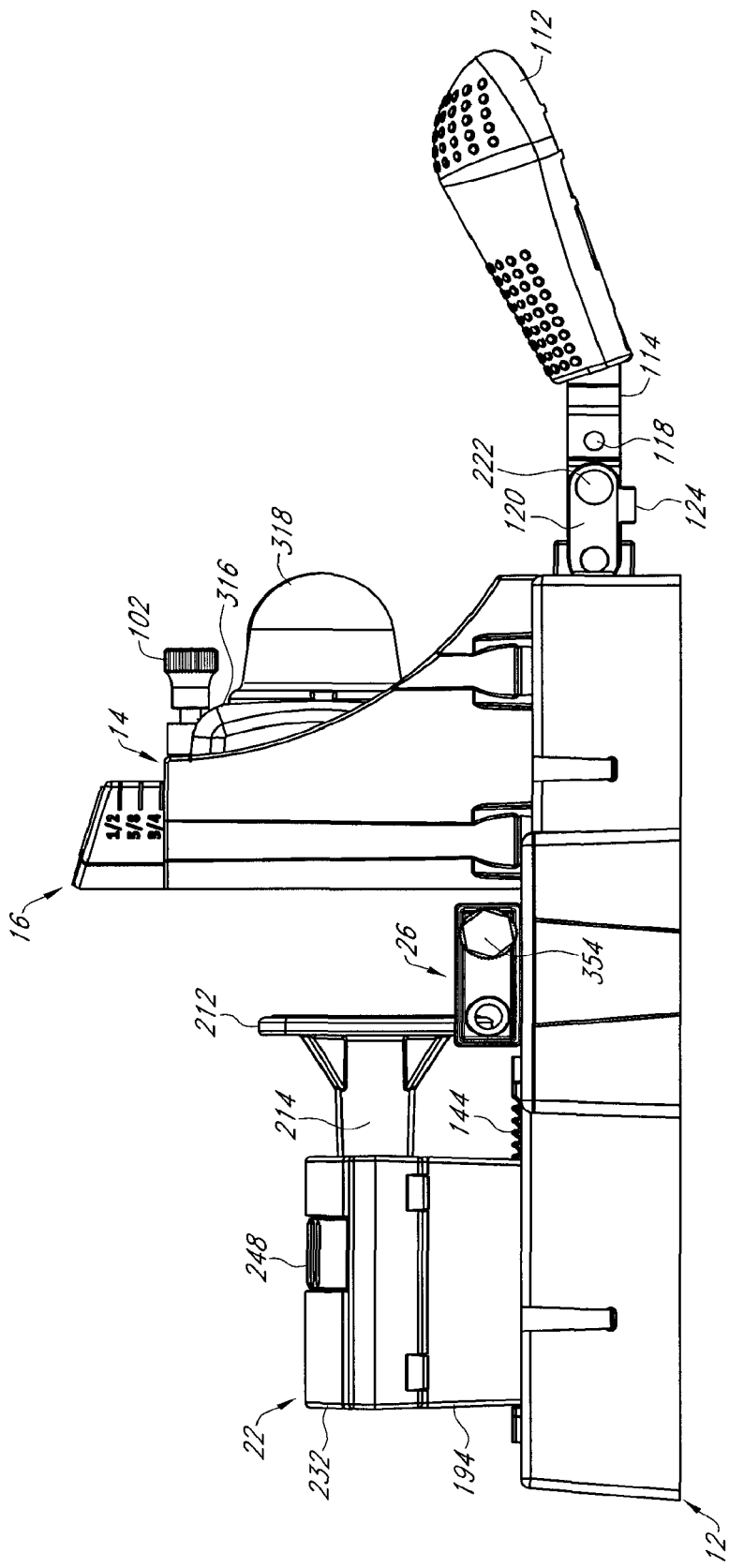
FIG. 19 is an elevation side view of the quick adjust ratcheting pocket hole jig, with the jig in a clamping position, with the dust catcher and a adjustable stop installed on the base.
Figure 20:
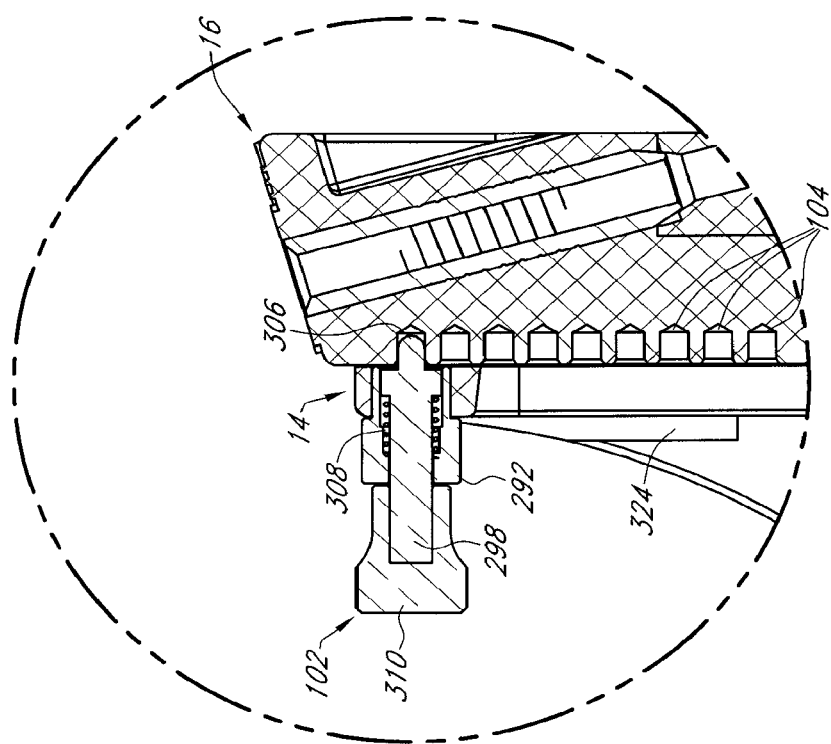
FIG. 20 is an elevation cut-away side view of the quick-adjusting locating pin inserted through the upright and into the guide assembly.
Figure 21:
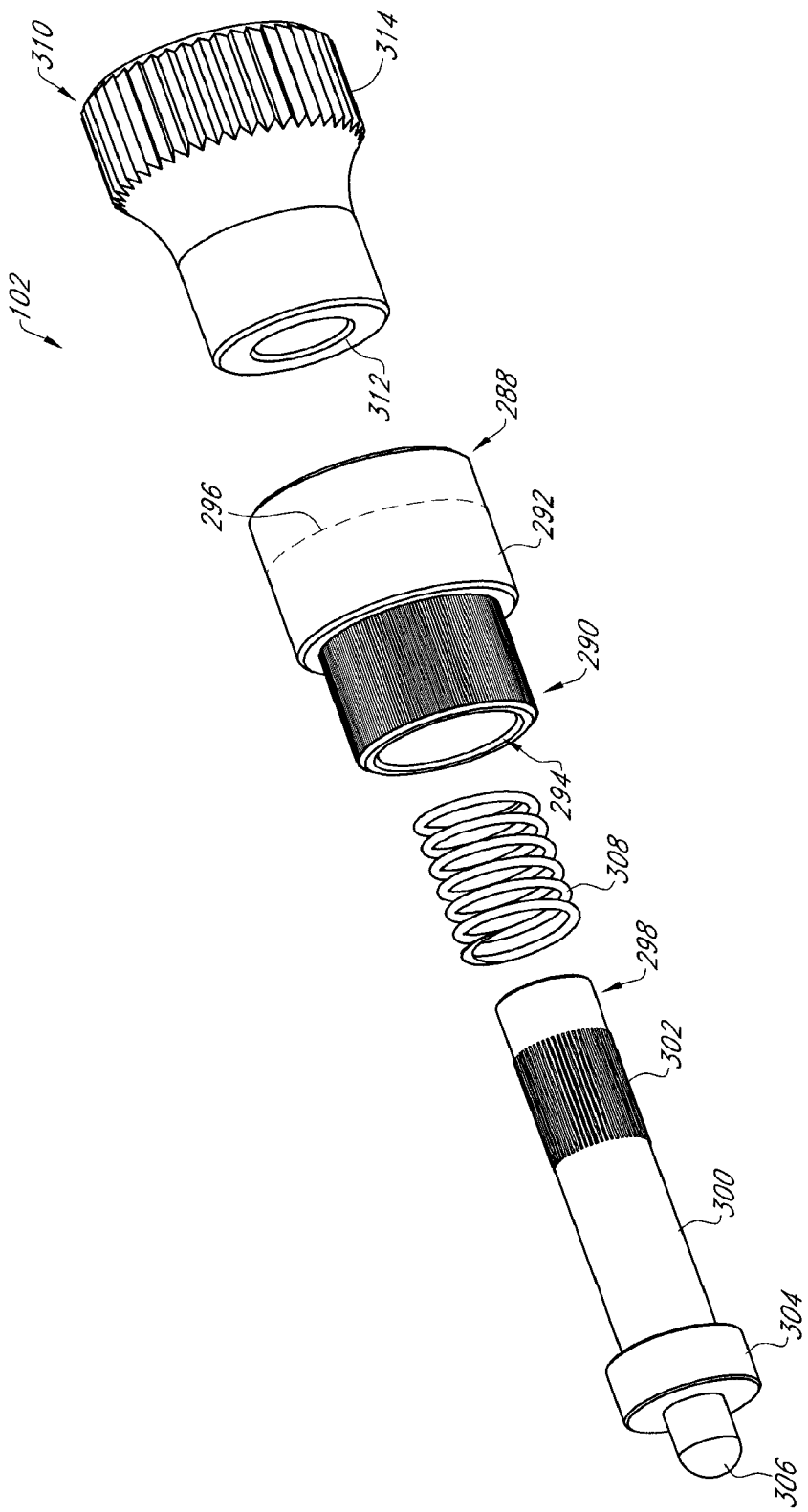
FIG. 21 is a perspective exploded view of quick-adjusting locating pin of the quick adjust ratcheting pocket hole jig.
Figure 22:
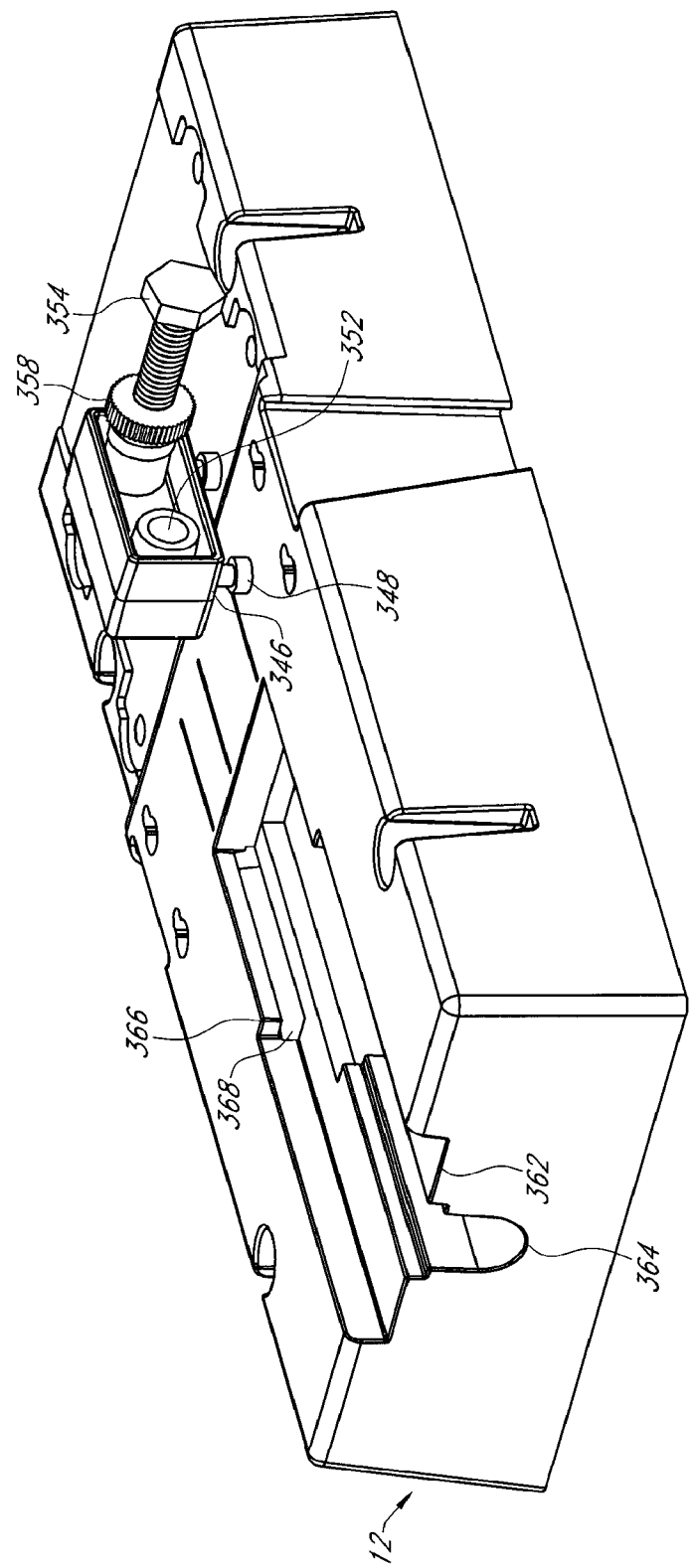
FIG. 22 is a perspective view of the base of the quick adjust ratcheting pocket hole jig, with an adjustable stop positioned above the base.
Figure 23:
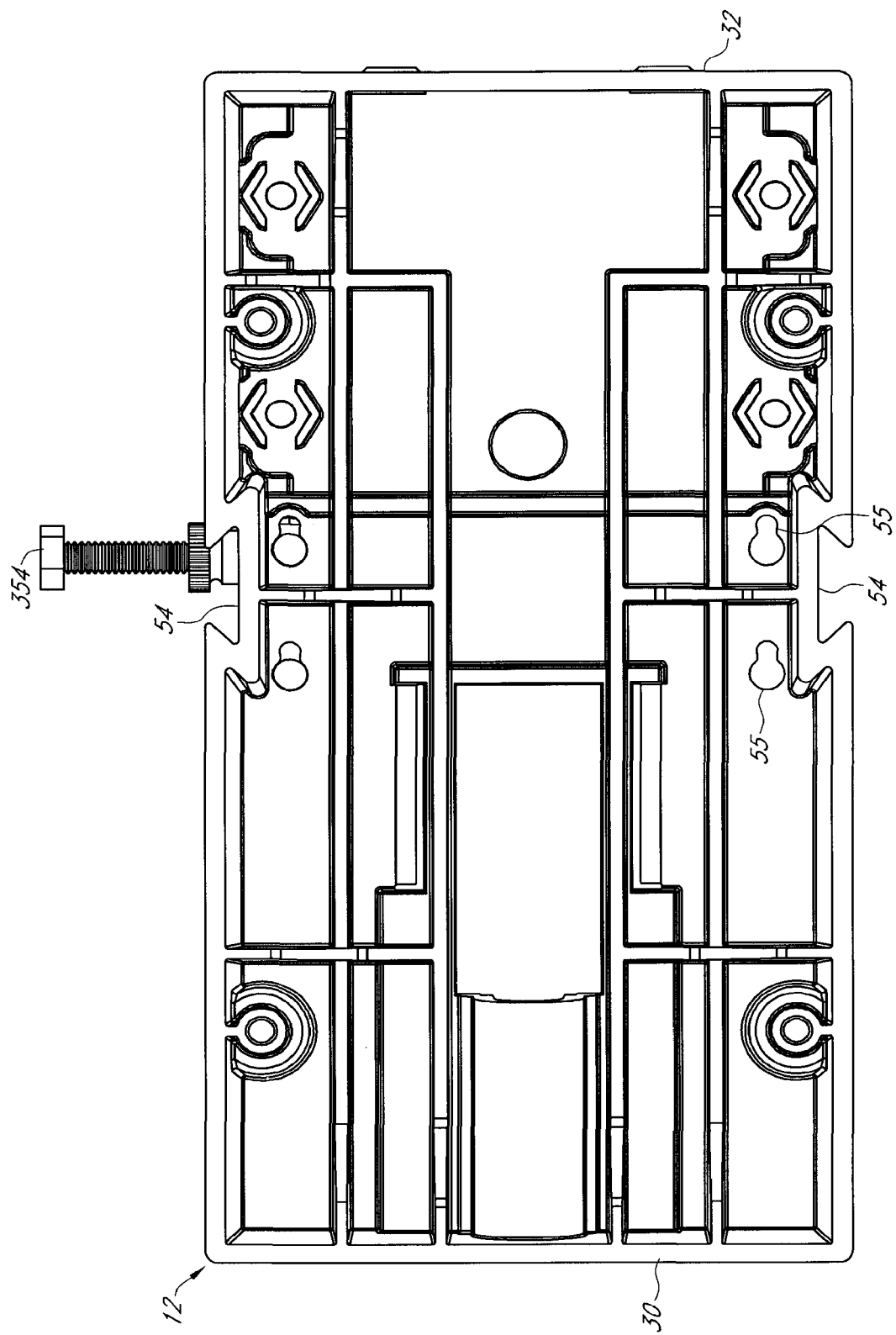
FIG. 23 is an elevation view of the bottom of the base of the quick adjust ratcheting pocket hole jig.
Figure 24:
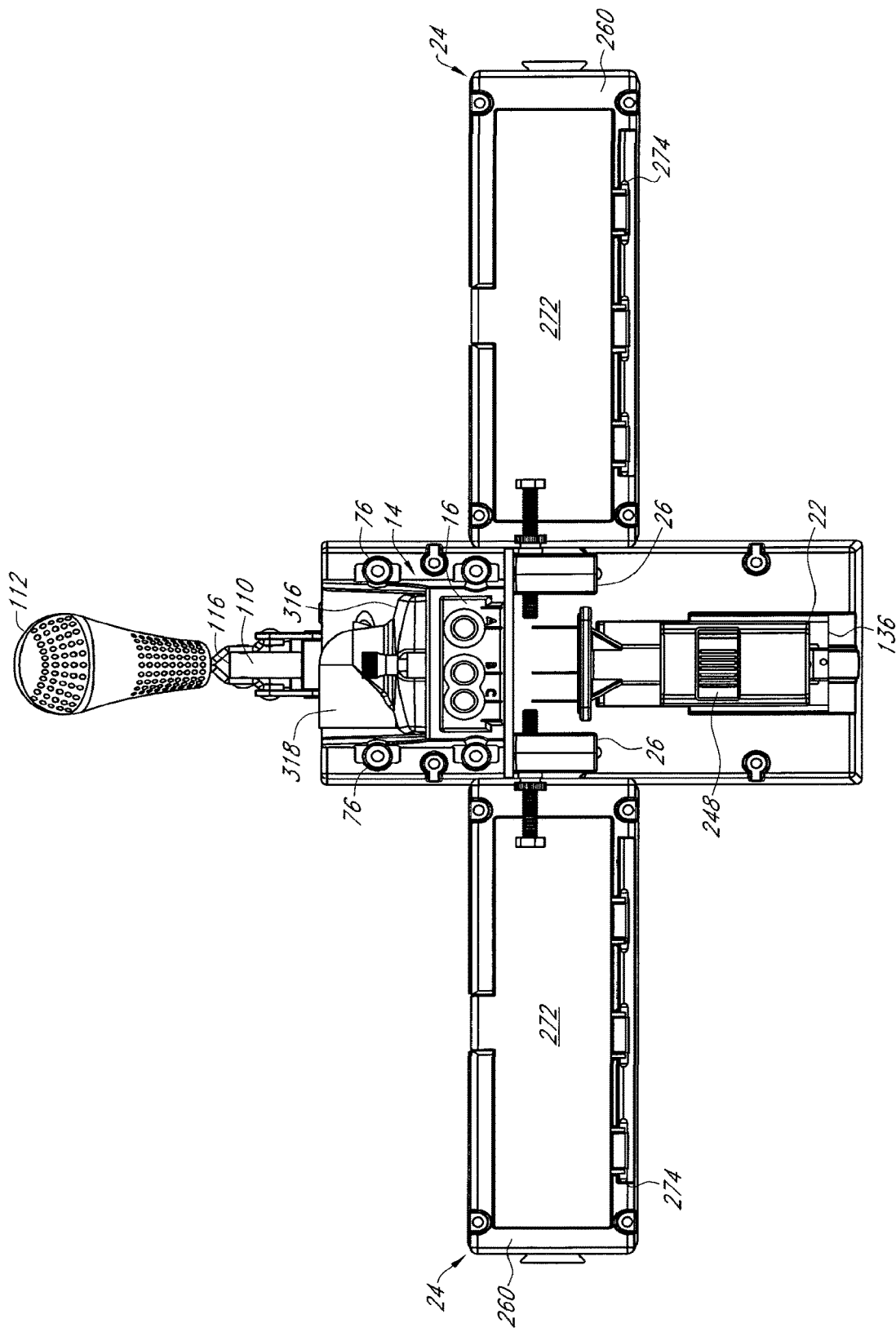
FIG. 24 is an elevation view of the top of the quick adjust ratcheting pocket hole jig in a clamping position with side supports, the dust catcher and adjustable stops attached.
Figure 25:
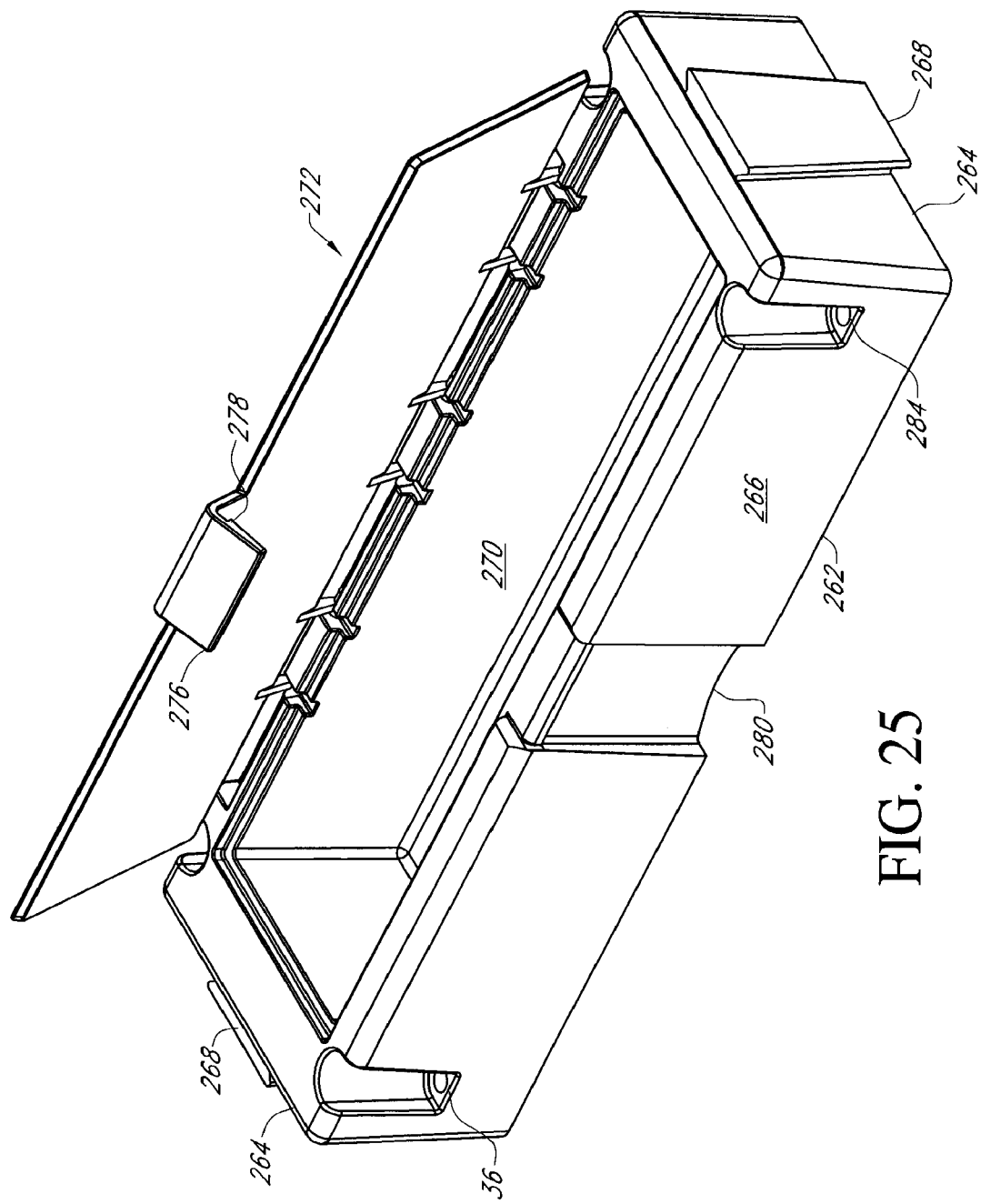
FIG. 25 is a perspective view of a side support of the quick adjust ratcheting pocket hole jig in an open position.
Figure 26:
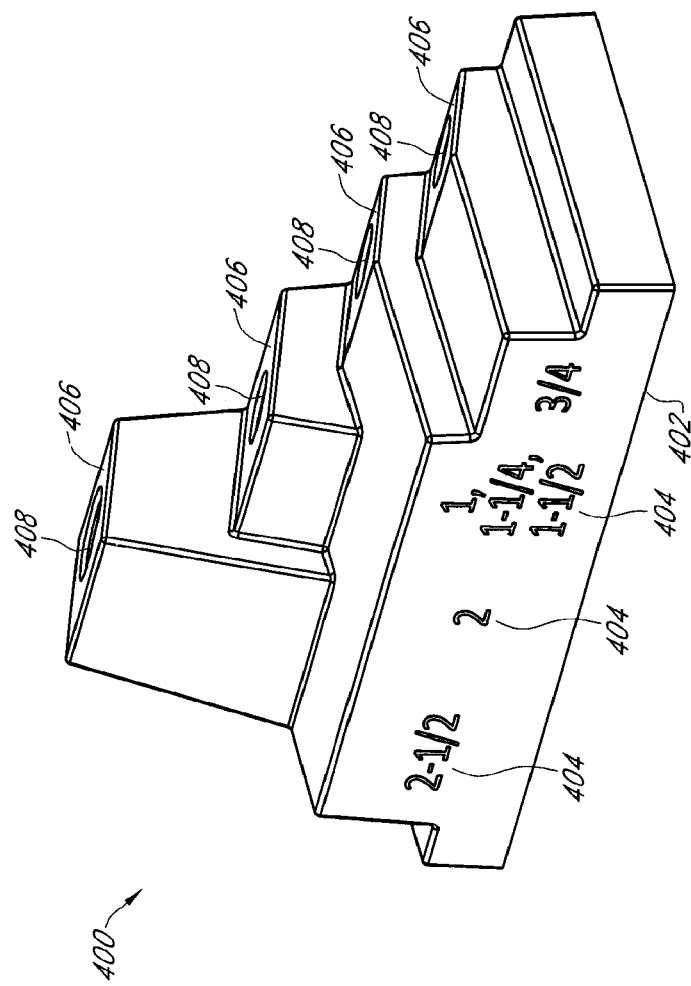
FIG. 26 is a perspective view of a drill setting guide for use with the quick adjust ratcheting pocket hole jig

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that mechanical, procedural, and other changes may be made without departing from the spirit and scope of the invention(s). The following detailed description is, therefore, not to be taken in a limiting sense, and the scope of the invention is defined only by the appended claims, along with the full scope of equivalents to which such claims are entitled.

As used herein, the terminology such as vertical, horizontal, top, bottom, front, back, end and sides are referenced according to the views presented. It should be understood, however, that the terms are used only for purposes of description, and are not intended to be used as limitations. Accordingly, orientation of an object or a combination of objects may change without departing from the scope of the invention.

With reference to the Figures, a pocket hole jig 10 is presented. Jig 10 is comprised of the following main component parts, a base 12, an upright 14 which is removeably connected to the base 12, a guide assembly 16 adjustably connected to the upright 14, a clamp assembly 18 having a handle portion 20 and a clamp follower portion 22 connected to the base 12, side supports 24, adjustable stops 26 and a dust catcher 28 removeably connected to the upright 14.

Base: Base 12 is of any suitable size and shape. As is shown in the embodiment of FIG. 1, base 12 is formed in a generally rectangular shape. Base 12 has a generally planar top surface which extends in a generally parallel spaced relation to planar bottom or surface or edge. Base 12 has opposing front sidewall 30 and back sidewall 32, which extend in generally parallel spaced relation to one another. Base 12 has opposing lateral sidewalls 34 which extend in generally parallel spaced relation to one another. Front sidewall 30 and back sidewall 32 and opposing lateral sidewalls extend in generally perpendicular alignment to one another. Also, sidewalls 30, 32, 34 taper slightly inwardly as they extend upward so as to allow for easy removal of base 12 from the mold in which it is formed.

Base 12 has a plurality of structural features connected to the bottom side of base 12 that provide additional strength and rigidity to base 12 as well as serve other purposes as is described herein. In addition, base 12 is securable to a planar surface, such as a substantially horizontal work surface by any suitable means. In the embodiment shown in FIG. 1, base 12 has a plurality recessed openings 36 positioned along the periphery or edge of opposing lateral sidewalls 34 through which conventional screws can be inserted for attachment of base 12 to a workbench or other planar surface.

Base 12 generally comprises two connected but separate sections, the front side adjacent front sidewall 30 and the back side adjacent the back sidewall 32. The front side and back side are generally separated by transition or step 38 which extends from lateral sidewall 34 to lateral sidewall 34 across the top surface of base 12. On the front side of transition 38 is generally flat upper planar work surface 40, which supports and receives the workpiece 42 when in use. The back side of transition 38, steps down to a recessed platform 44 which matingly receives the bottom surface of upright 14.

Recessed platform 44 has a planar upper surface. Its periphery or edge 46 is raised to generally the level of upper planar work surface 40. The edge 46 of recessed platform 44 is sized and shaped to fit and receive the bottom surface of upright 14 with close tolerances, such as hand-in-glove arrangement, so as to provide for easy placement without the need to precisely align upright 14 upon base 12. As is shown in the Figures, edge 46 includes a plurality of foot-cut-outs 48 therein that receive corresponding features of upright 14 and assist with alignment thereof. A through hole 50 is positioned in the center of each of these foot-cut-outs 48 which receive a conventional screw or bolt for attachment of upright 14 thereto. Positioned below the foot-cut-outs 48 and aligned with each through hole 50 is a nut-pocket 52. Nut pocket 52 is any recess sized and shaped to hold a conventional fastener such as a hexagonal nut. Alternatively, the interior surface of through hole 50 is threaded to removably and replaceably receive a conventional screw without having to use a separate nut.

Pin cut recesses 54 of a dovetail joint are positioned adjacent approximately the center of the lateral sidewalls 34. Pin cut recesses 54 are designed to receive a corresponding tail cut section of a dovetail joint. Pin cut recesses 54 have opposing edges that taper inwardly as they transition from the lateral sidewall 34 towards the center of base 12 thereby forming an acute angle; and taper inwardly toward one another as they transition from top edge to bottom edge of base 12. In this way, pin cut recesses 54 serve to firmly and securely hold side supports 24 therein. In an alternative arrangement, the dove tail joint could angle in the opposite direction, that is the dove tail joint gets wider as it goes down.

Key holes 55 are positioned in the top surface of base 12 in the upper planar work surface 44 adjacent transition 38 and/or the forward edge of recessed platform 44. Key holes 55 are any locking slot known, and include a conventional key hole having a larger circular opening connected to a smaller circular opening, or the like.

Base 12 also has an opening in the work surface 40 which receives clamp assembly 22 which is described in greater detail herein.

Upright: Upright 14 has a generally flat bottom surface 56 that connects to a pair of opposing substantially vertical sides 58 which extend upwardly therefrom. Sides 58 include opposing curved portions 60 (one shown), adjacent the back side of upright 14 which provide additional strength, stability and rigidity to the structure, although the invention is not so limited. Each of the opposing curved portions 60 form one side of a triangular gusset portion 62 (shown in dashed lines). The two gusset portions 62 are located on opposing sides of the upright 14 and provide additional support to the upright 14 to avoid any twisting or turning which may occur from operating the jig 10, especially including forces applied from the front side or back side of the device 10, such as during drilling or clamping.

Upright 14 has an opening 64 which receives guide assembly 16 therein. Opening 64 is positioned between opposing vertical sidewalls 58, back wall 66 and bottom wall 68. Sidewalls 58 connect at their bottom edge to bottom wall 68 and adjacent their back edge to back wall 66 which extends between opposing sidewalls 58. In addition, opposing partial front walls 70 are connected to the front edge of sidewalls 58 and extend inwardly toward one another therefrom, but do not connect to one another. The bottom edge of partial front walls 70 connect to the front edge of bottom wall 68. In this way, walls 58, 66, 68 and 70 form a generally rectangular opening therebetween that is strong and rigid in which guide assembly 16 is interlocked or "captured on five sides. In this way an overall more "fluid" adjustment motion is achieved as well as improved strength, longevity and rigidity.

Partial front walls 70 extend any length inwardly with respect to one another and back wall 66 as long as partial front walls 70 do not interfere or cover up openings in guide assembly 16 needed for forming pocket holes. In one embodiment, each partial front surface 70 is about 5% to 20% of the length of the back wall 66. In one embodiment, the back wall 66 is about three (3) to four (4) ins (about 7.6 to 10.2 cm) in length, each side surface 58 is about 0.5 to two (2) (about 1.27 to 5.1 cm) in length and each partial front wall 70 is about 0.25 to 1.5 ins in length (about 0.64 to 3.8 cm) in length. In a particular embodiment, the back wall 66 is about 3.5 inches (about 8.9 cm) in length, each side wall 58 is about one (1) inch (about 2.54 cm) in length and each partial front wall 70 is about 0.25 inches (about 0.64 cm) in length. In one arrangement the front edge of partial front walls 70 are flat and smooth and extend in approximate parallel spaced relation to one another and engage the workpiece when in use. In addition, when in use, in one arrangement, the front surface of guide assembly 16 is in alignment with the plane of partial front walls 70 when in use, to provide a rigid and robust flat surface for forming pocket holes.

Bottom wall 68 in one arrangement has one or more protrusions 72 which are raised above the top surface of bottom wall 68 which to prevent waste material from interfering with placement of the guide assembly 18 in a lower position. The front surface of these protrusions 72 are in alignment with the front surface of partial front walls 70 and therefore also support a workpiece (not shown) and are designed to maintain a coplanar relationship between the two partial front walls 70 and the front surface of the guide assembly 16 during clamping and drilling. The protrusions 72 are of any suitable size and shape. In the embodiment shown in FIG. 1, the protrusions 72 are rectangular-shaped rails that connect at their back edge to the front edge of back wall 66, and at their bottom edge to the top surface of bottom wall 68. In one embodiment, there are two to three protrusions about 0.75 to 1.5 in. (about 1.9 to 3.8 cm) in length and about 0.13 to 0.25 inches (about 0.32 to 0.64 cm) in height and width.

Back wall 66 has a plurality of exit holes 74 positioned therein. Exit holes 74 are positioned in parallel spaced alignment with one another and take the shape of a rounded top edge, a rounded bottom edge with flat and parallel sidewalls connecting therebetween. Exit holes 74 provide an exit for chips formed during drilling. Back wall 66 also has a pin opening 75 therein adjacent the top edge of back wall 66, Alignment markings (not shown) can be positioned along any portion of upright 14 to assist with alignment of the workpiece.

Feet 76 are connected to the exterior surface of opposing vertical sides 58. Feet 76 take on any shape suitable for connecting upright 14 to base 12. In one arrangement, feet 76 have a flat bottom surface which extends in parallel spaced alignment with the bottom surface of bottom wall 68, and a flat top surface which extends in parallel spaced alignment with its flat bottom surface. Feet 76 extend perpendicularly out of vertical sides 58. Feet 76 have a generally centrally positioned through hole 78 which accepts a conventional screw or bolt to pass there through for attachment of upright 14 to base 12. In the arrangement depicted, buttresses 80 extend out of vertical sides 58 and connect to the front edge and back edge of feet 76 thereby providing additional strength and rigidity to feet 76. When viewed from the side, buttresses 80 are generally triangular in shape. Buttresses 80 generally extend in parallel spaced relation to one another. Semi-circular recesses 82 are positioned in the exterior surface of vertical sides 58 and are centered to and aligned with each foot 76 so as to provide additional clearance for a screwdriver to assist with the placement and removal of a screw or bolt into through hole 78 for connecting upright 14 to base 12.

In the arrangement depicted, two feet 76 are positioned along the exterior edge of vertical sides 58, one adjacent the forward edge of upright 14 and one adjacent the rearward edge of upright 14. As such, in this arrangement, four feet 76 are used to connect upright 14 to base 12, which provides a strong, rigid and durable connection. However, more or less feet are hereby contemplated, as are other methods of connecting upright to base 12. When upright 14 is positioned in the proper alignment on the upper surface of base 12, the exterior periphery of upright 12, including bottom wall 68, sidewalls 58, back wall 66, feet 76 and buttresses 80 match or matingly receive or flushly and engagingly fall into recessed platform 44. In this alignment, the through holes 78 of feet 76 align with the through holes 50 of foot cut outs 48 and when a screw or bolt is passed there through it engages a nut positioned in nut pocket 52 thereby providing a tight and tightenable connection therebetween. In addition, in this alignment, the edge 46 of recessed portion 44 is positioned in engagement around the exterior bottom edge of upright 14, as is described herein thereby providing simple alignment and installation as well as a rugged and strong device.

Guide Assembly: Guide assembly 16 shown in the figures fits and slides within opening 64 of upright 14. Guide assembly 16 is comprised of a guide block 82 and a guide block holder 84. The guide assembly 16 is designed to form a co-planar surface with the partial front walls 70 which together define the front portion or front face of opening 64. In one embodiment, this is accomplished by providing the guide block holder 84 with a wider back section 86 and a narrower front section 88, with a step or notch therebetween. The wider back section 86 is the portion of the guide block holder 84 secured within the opening 64 of upright 14. The narrower front section 88 is essentially flush not only with the front faces of the partial front walls 70 but also with the front face of the guide block 82 once the guide block 82 and guide block holder 84 have been assembled. The guide block holder 84 preferably has a smooth bottom surface, i.e., a substantially horizontal bottom surface, allowing it to be used alone on a flat surface with a handheld clamp without any type of base or holder. Alternatively, guide block holder 84 has alignment notches 90 in its bottom surface which are sized and shaped to matingly receive protrusions 72 positioned in the bottom wall of upright 14. These notches 90 also provide advantages when wood chips or other obstructions are positioned below the guide block 82 and opening 64 of upright as these obstructions can be received within notches 90.

The guide assembly 16 is provided with multiple guide channels 92. In the embodiment shown in FIG. 1, three guide channels 92A, 92B, 92C are presented having varied spacing, although the invention is not so limited. In other embodiments, only one or two or more than three guide channels may be present and/or the guide channels may be movable. However, the use of fixed guide channels, such as the three (3) fixed guide channels 92 having varied spacing as shown in FIG. 1 provides for three different two-hole drilling combinations without the use of moving parts as described in U.S. Pat. No. 6,481,937 (hereinafter "'937") and U.S. Pat. No. 6,726,411 (hereinafter "'611"), commonly assigned, both incorporated herein by reference in their entirety. The guide block 82 further has guide block exit holes 94 which are aligned with at least a portion exit holes 74 respectively, when the guide assembly 16 is positioned properly within the opening 64 of upright 14. Exit holes 74 serve as "chip breakers" by allowing chips or waste material generated during drilling, to exit. Allowing for easy exit of chips improves the quality of the holes drilled and the ease of drilling by preventing the chips to build up within the guide assembly 16 during a drilling operation. This also improves the cleanliness of using the jig. Guide block openings 96 in the front portion of the guide block 82 help to further guide a drill bit and also serve as a support to reduce "tear-out", thus producing cleaner holes, as is known in the art. The guide block openings 96 further allow a drill bit to exit the front side of the guide assembly 16 and make contact with a workpiece.

The axial drill guide bore of each guide channel 92 is disposed to receive and guide the shank of a drill bit. (See also U.S. Pat. No. 4,955,766, commonly assigned and incorporated herein by reference). The guide channels 92 are angularly disposed with respect to the front vertical planar surface of guide block 82 and guide block holder 84. Although the precise angle can vary, an angle of about 15 degrees is commonly used to form pocket joints in wooden or composite (i.e., material dense fiberboard (MDF), particle board, etc.) workpieces, although the invention is not so limited. The angle can also be greater or less than 15 degrees. In a particular embodiment the angle is about 14 degrees. The upper end of each guide channel 92 forms an extended surface or a stop flange 98 that helps to stop the drill bit stop collar.

In the embodiment shown in FIG. 1, the guide assembly 16 has a substantially vertical front planar surface and an angled top portion 100 which is generally aligned perpendicular to the axis of drill guide bores 92A, 92B, 92C, although the invention is not so limited. The wider back section 86 of the guide assembly 16, i.e., the portion which slides down into the upright 14, is necessarily sized to be slightly smaller than the opening 64 so that it can be moved up and down within the opening 64 yet not slip out of position when a contact device, such as a locating pin 102 as shown in FIG. 1, is pressed against it.

Guide assembly 16 can be placed at essentially any vertical position within the upright 14 thus providing infinite vertical adjustment capabilities. This provides additional flexibility over devices providing only incremental adjustments of specific distances. As noted above, the guide assembly 16 is held in place with the locating pin 102 which can contact the back surface of the guide assembly 16 at any location, as long as the guide assembly 16 remains secure within the upright 14 during drilling.

To facilitate alignment and positioning of guide assembly within upright 14 a plurality of preexisting openings 104 are aligned with the center of pin opening 75, in vertically spaced relation with one another and extend a distance into the guide block holder 84. Preexisting openings 104 correspond with common material thicknesses. Corresponding thickness markings 106 (which are determined according to methods known in the art) positioned in the side 108 of guide block holder 84 correspond with each pre-existing openings 104. In this way, proper placement of pocket holes in workpieces of various thicknesses can easily be achieved. This includes workpieces greater than about 1⅛ inches (29 mm) as well as thinner workpieces less than about ¾ inches (19 mm) down to about ½ inch (13 mm). As a result, a pocket hole can be drilled further from the edge of the workpiece, allowing a screw to exit essentially in the center of the workpiece, as desired. As such, the various embodiments of the present invention provide virtually unlimited vertical adjustability without the need for separate components.

Clamp Assembly: Clamp assembly 22 can take on any number of configurations. In the embodiment shown in FIG. 1, clamp assembly 18 has a handle portion 20 which is connected to and actuates a clamp follower portion 22. Handle portion 20 interacts with the clamp follower 22 via rod 110. As shown, only a single round solid rod 110 is used, however, any suitable number and type of rods or rod assemblies is hereby contemplated for use. In other embodiments, more than two rods are used. The rods can take on any configuration such as square, circular, rectangular, and the like, or otherwise a cable or multiple cables or any actuating device is used. In one embodiment, the rod 110 is a tie-rod, or a hollow cylindrical tube or solid cylindrical rod, or alternatively a hollow square tube or solid square rod. In yet other embodiments, rod 110 is replaced with other types of connectors, such as linkage arms or cables or a pneumatic clamp assembly.

Handle portion 20 has a handle 112 which extends from a first rounded edge to a second end. Connected to and extending out of the second end of handle 112 is a pair of arms 114. Arms 114 spread out from one another in Y-shaped or V-shaped fashion such that the distance between the interior surface of each arm 114 is sufficient enough to receive the first end 116 of rod 110. Arms 114 are pivotally connected to the first end 116 of rod 110 by way of a first axel 118. Arms 114 extend a distance past first axel 118 and connect to pivoting levers 120 by way of rotatable joint 122. In the arrangement shown, opposing pivoting levers 120, are connected to one another by way of torsion arm 124 which extends across the bottom edge of pivoting levers 120. Torsion arm 124 serves to improve the rigidity of the clamping motion by preventing or reducing rotation on rod 110 when clamping, and it provides a stop when clamping. More specifically, torsion arm 124 stops rotation of handle 112 torsion arm 124 engages the bottom of rod 110, approximately at full closure. The forward end of pivoting levers 120 pivotally connect to the exterior sides of rod housing 126 through second pivoting joints 128.

Rod housing 126 has a centrally positioned through hole 130 which is sized and shaped to closely receive and pass rod 110 there through. Through hole 130 passes through a generally square or rectangular body 132 which has flanges or arms extending outwardly therefrom. Rod housing 126 is connected to the exterior surface of back sidewall 32 and connected thereto by conventional screws or bolts to hold it in place. Alternatively, rod housing 126 is positioned partially within the interior of base 12 with the flanges 134 positioned inside base 12 and the rectangular body 132 extending out of an opening in the back sidewall 32 of base 12.

Second end 135 of rod 110 is threaded, either on its exterior surface or its interior surface. The second end 135 of rod 110 is screwed or bolted to the clamp follower 22. Clamp follower 22 has a ratchet plate 136. Ratchet plate 136 is generally flat and rectangular in shape with a step, groove or flange 138 which extends along each opposing lateral edge of ratchet plate 136 in parallel spaced relation, from front to back. A centrally positioned slot 140 is positioned adjacent the center of ratchet plate 136 and provides an opening there through. Slot 140 terminates in a rounded edge adjacent the front and back edges of ratchet plate 136.

A ratcheting member 142 is connected to and/or positioned within ratchet plate 136. Slot 140 also passes through ratcheting member 142. Ratcheting member 142 includes a plurality of teeth 144 which extend upwardly from the top surface of ratchet plate 136, however in other arrangements teeth 144 could extend out of the bottom surface or any other surface of ratchet member 142. These teeth 144 are separated into parallel pairs, with one tooth of the pair positioned on each side of the slot 140. In one arrangement ratchet plate 136 is an injected molded plastic or composite piece of material whereas ratcheting member 142 is a metallic piece which is molded within ratchet plate 136. Forming ratcheting member 142 out of a metallic piece provides the teeth 144 with additional strength, durability, wear resistance and rigidity. In this arrangement, ratchet plate 136 is permanently connected to, formed around and/or injection molded around ratcheting member 142 thereby providing a rigid unitary solid piece.

A connecting tab 146 extends downwardly from the bottom surface of ratchet plate 136. Connecting tab 146 is formed of any suitable size and shape. In one arrangement, as is shown, connecting tab 146 has a flat front face 148 which extends in a generally vertical manner, and has a generally centrally positioned through hole 150 positioned adjacent its bottom end. Angular buttresses 152 extend at an angle between the rearward side of connecting tab 146 and the bottom surface of ratchet plate 136. Buttresses 152 provide additional strength and rigidity to tab 146 and prevent rotation, warping or deflection during use. Connecting tab 146 extends a distance from side to side that is sufficient to provide needed structural rigidity. Connecting tab 146 fits between opposing guide walls 154 of base 12 with relatively close tolerances, thereby providing alignment. Guide walls 154 extend from approximately the top of base 12, to the bottom of base 12, or any distance therebetween. Guide walls 154 extend at least a portion of the distance between the front sidewall 30 to the back sidewall 32, and provide guidance to tab 146 as it slides forward and back within base 12 between a forward most position and a rearward most position. Connecting tab 146 is connected to the second end 135 of rod 110 by way of passing a conventional screw through the through hole 150 of tab 146 and into the threaded hole of the second end 135 of rod 110, or alternatively, by passing a threaded portion of rod 110 through hole 150 and screwing a conventional nut there over, or by any other connection means or methods.

A bottom keeper 156 is positioned below ratchet plate 136. Bottom keeper 156 is positioned behind connecting tab 146. Bottom keeper 156 is formed of any suitable size and shape. In one arrangement, as is shown, bottom keeper 156 has flat and straight sidewalls 158 which extend in parallel spaced relation to one another and terminate in rounded ends 160. Bottom keeper 156 has a pair of openings 162 positioned adjacent the forward and rearward end of bottom keeper 156 at approximately the center of the bottom keeper 156 between sidewalls 158. A forward and rearward guide 164 is positioned on both the forward and rearward side of each opening 162 and extends upwardly therefrom a distance. Like bottom keeper 156, guides 164 have flat sides with rounded forward and rearward edges which are sized and shaped to fit within slot 140 of ratchet plate 136. The forward and rearward guides 164 are designed in size and shape to be matingly and slidingly received in slot 140 of ratchet plate 136. The flat sides of forward and rearward guides 164 engage the sidewalls of slot 140 and provide alignment therewith, the rounded ends of forward and rearward guides 164 matingly engage the rounded ends of slot 140 and provide endmost forward and rearward stop of bottom keeper 156 within slot 140. Conventional bolts or screws 166 extend through each opening 162, between the forward and rearward guides 164 and through slot 140 thereby connecting bottom keeper 156 to other components of the device as is described herein. When screws 166 are inserted between the forward and rearward guides 164 and then both screws 166 and forward and rearward guides 164 of bottom keeper 156 are inserted into the slot 140 of ratchet plate 136, the top surface of bottom keeper 156 is in flush alignment and flush sliding engagement with the bottom surface of ratchet plate 136. In this position, bottom keeper 156 fits within recess 168 on the bottom side of ratchet plate 136. Recess 168 is sized and shaped with flat sidewalls 170 and rounded ends 172 which, with close tolerances to provide sliding alignment, allow bottom keeper 156 to slide a distance forward and backward before rounded end 160 of bottom keeper 156 engages rounded end 172 of recess 168, thereby causing bottom keeper 156 to stop its forward or backward travel within recess 168. Also, in this alignment, the forward or rearward end of forward and rearward guides 164 engage the rounded end of slot 140 of ratchet plate 136.

Top keeper 170 is positioned directly above ratchet plate 136 which is positioned above bottom keeper 156. Top keeper 170 is formed of any suitable size, shape and design. In one arrangement, as is shown, top keeper 170 has a generally flat and rectangular body with a rectangular longitudinal groove 172 positioned in the bottom surface of top keeper 170. Longitudinal groove 172 extends the front to back length of top keeper 170 and is sized and shaped to closely align, but not interfere, with the raised teeth 144 of ratcheting member 142. The sides of groove 172 align with and slide along the outside edges of raised teeth 144, thereby providing for free forward to back sliding of top keeper 170 over teeth 144 of ratcheting member 142. That is, when top keeper 170 is positioned on the top surface of ratchet plate 136, teeth 144 of ratcheting member are positioned within groove 172 which allows top keeper 170 to slide along the top surface of ratchet plate 136 without engaging teeth 144. Top keeper 170 has a pair of holes 174 through which screws 166 extend, but not forward and rearward guides 164 of bottom keeper 156. Instead, the bottom edge of forward and rearward guides 164 engage the bottom surface of top keeper 170, thereby providing appropriate spacing between top keeper 170 and bottom keeper 156 with the ratchet plate 136 positioned therebetween.

Top keeper 170 also has an opening 176 positioned therein that is aligned with groove 172 so as to provide access to teeth 144 thereunder when in position on top of ratchet plate 136. In the arrangement depicted, opening 176 is rectangular and extends roughly the lateral width of groove 172, or across the entire width of groove 172, thereby providing access to the entire length of teeth 144 on both sides of slot 140, or alternatively, if the opening 176 is made smaller, only providing access to a portion of teeth 144. Opening 176 is positioned between holes 174. In one arrangement opening 176 is rectangular with sides that extend vertically or perpendicular to the top surface of top keeper 170. Alternatively, the forward most edge of opening 176, is angled, or curved, thereby providing improved strength and access to teeth 144.

Cradle 178 is positioned adjacent opening 176. Cradle 178 extends roughly the same width of opening 176. Cradle 178 is raised above the top surface of top keeper 170 and has a generally rectangular base, with an arcuately curved top surface. That is, when viewed from the side, the top surface of cradle 178 is formed in the shape of a partial circle or arc which opens upwardly. Cradle 178 provides a fulcrum for access to teeth 144 through opening 176. Cradle 178 is also positioned between holes 174. A lateral groove 180 extends across the width of top keeper 170 and in this way is aligned perpendicularly with longitudinal groove 172. Lateral groove 180 is positioned between holes 174.

Tooth engaging member 182 is a positioned above top keeper 170. Tooth engaging member 182 is formed of any suitable size and shape. In one arrangement, as is shown, tooth engaging member 182 is an irregularly shaped member. The rearward end of tooth engaging member 182 has a tooth tab 184 which extends outwardly and/or slightly downwardly therefrom. Tooth tab 184 is sized and shaped to fit within opening 176 in top keeper 170 and extend there through so as to engage the top surface of teeth 144 of ratchet plate 136 so as to prevent rearward motion of the top keeper 170 on ratchet plate 136. Tooth tab 184 is narrower than the body of tooth engaging member 182 and opening 176. Positioned forward of tooth tab 184, in the body of tooth engaging member 182, is an arcuate bend 186, which extends outwardly from the bottom surface of tooth engaging member 182. Arcuate bend 186 is sized and shaped to fit and be matingly received within the arcuate top surface of cradle 178 such that tooth engaging member 182 rotates upon cradle 178 when in use. Tooth engaging member 182 terminates opposite of tooth tab 184 at stop tab 188. Stop tab 188 is generally bent perpendicular to the body of tooth engaging member 182, and/or extends vertically downwardly from the body of tooth engaging member 182. In contrast, tooth tab 184 extends downwardly at an angle from the body of tooth engaging member 182. When fully rotated upon cradle 178 in a rearward position, tooth tab 184 fully engages teeth 144 through opening 176 (i.e. locked position); when fully rotated upon cradle 178 in a forward position, stop tab 188 is fully engaged in lateral groove 180 of top keeper 170 (i.e. free position). In one arrangement, tooth engaging member 182 and/or top keeper 170 are formed of a metallic material so as to provide extreme strength, durability, wear resistance, rigidity, machinability and ease of use, alternatively any other material such as fiberglass, plastic, composite or the like are used. Tooth engaging member 182 is positioned between the forward and rearward screws or bolts 166. As can be seen in the side cut-away view, the forward edge 189A of opening 176 angles from front-to-back as it extends downward. This angle of forward edge 189A matches the angle of tab 184 when it is in full engagement of teeth 144, thereby providing additional alignment, strength and rigidity to the design. In addition, as can be seen in this view, the rearward end 189B of tab 184 is cut at such an angle that when it is in full engagement of teeth 144 the forward plane of teeth 144 is parallel to the plane of rearward end 189B of tab 184, thereby providing additional alignment, strength and rigidity to the design and better engagement between tab 184 and teeth 144.

At least one compressible member 190 is positioned between tooth engaging member 182 and top keeper 170. Compressible member 190 is any compressible object, tool, piece or device such as a spring, a piece of compressible material such as rubber or foam, or any other compressible piece. As is shown in the figures, a compressible ball is used, but the invention is not so limited. Compressible member 190 is positioned in recess 192 on the bottom side of tooth engaging member 182, which serves to retain compressible member 190 therein. Recess 192 is positioned between arcuate bend 186 and stop tab 188. Compressible member 190, in a static position, forces up on tooth engaging member 182, which serves to force tooth tab 184 into opening 176 of top keeper 170 such that it fully engages teeth 144. When the upward force of compressible member 190 is overcome, tooth tab 184 rotates upon arcuate bend 186 in cradle 178 which withdraws tooth tab 184 from opening 176, which allows top keeper 170 to slide along ratchet plate 136, until stop tab 188 engages lateral groove 180.

Housing 194 is positioned above bottom keeper 156, ratchet plate 136, top keeper 170 and tooth engaging member 182. Housing 194 is formed of any suitable size, shape and design. In one arrangement, as is shown, housing 194 has a generally rectangular or cube shape, as well as other features. The bottom surface 196 of housing 194 is generally flat, with a recess and/or opening therein to receive and hold tooth engaging member 182 and top keeper 170 thereto and therein. Bolts or screws 166 extend upwardly into housing 194 and are threadably received by mating through holes 198. Alternatively, instead of bolts or screws 166 threadably engaging the material of housing 194 itself, nut pockets and corresponding conventional nuts 197 are presented within the open interior of housing 194 through which bolts or screws 166 threadably engage and tighten against. Nut pockets 197 are held within an internal frame structure 199 of housing 194. When screws or bolts 166 are tightened, this tightens the bottom keeper 156, ratchet plate 136, top keeper 170, tooth engaging member 182 and housing 194 together.

The rearward end of housing 194 is generally flat and flush. The forward end of hosing 194 has an opening 200 therein. As is depicted, opening 200 is positioned in the top edge 202 of housing 194, and is square or rectangular in shape. Positioned rearward thereof, a semi-circular collar 204 is positioned within the open interior of housing 194. Also, positioned along the lateral edges 206 are at least one, and as is shown a pair of, snap fit openings 208. Housing 194 is made of any suitable material such as metal, plastic or composite or any other material. In addition other structural components are positioned within the open interior of housing 194 so as to provide additional or necessary strength and rigidity, while minimizing cost and manufacturing difficulty.

As seen in the side cut-away view, positioned in the internal frame structure 199 of housing 194 is a cross brace 199A. Cross brace 199A is positioned a distance above the bottom edge 196 of housing 194 thereby providing a space therebetween. Cross brace 199A extends in parallel spaced relation with bottom edge 196 and terminates at its forward and rearward edges at the structure which receives screws or bolts 166 and/or nut pockets 197. Positioned within this cross brace 199A is pivot point 199B. Pivot point 199B is arcuately shaped and extends downwardly from cross brace 199A. Pivot point 199B is sized and shaped to engage the length of or a point of the top surface of arcuate bend 186 of tooth engaging member 182 thereby frictionally holding arcuate bend 186 into cradle 178 and allowing tooth engaging member 182 to pivot thereon, while holding the component parts together. Also seen in this view is that top keeper 170 fits within a recess of the bottom surface of housing 194 such that the planar bottom edge 197 of housing 194 is positioned in parallel flush alignment with the planar bottom surface of top keeper 170. Also, the bottom edge 196 of housing 194 also has a corresponding groove 199C, which matches the profile of rectangular groove 172 in top keeper 170.

Plunger assembly 210 is positioned within the open interior of housing 194. Plunger assembly 210 is formed of any suitable size, shape and design. In one arrangement, as is shown, plunger assembly 210 has, on its forward most end, a plunger pad 212. Plunger pad 212 is any size and shape, however a square pad having a flat and flush front face that aligns in the vertical plane is presented. Plunger pad 212 is connected on its rearward side to plunger body 214. As is presented, plunger body 214 is generally square or rectangular in shape, with its square sides and/or edges in alignment with the square sides or edges of plunger pad 212. At least one, if not a plurality of buttresses 216 extend between the forward end of plunger body 214 and the rearward side of plunger pad 212. In the arrangement depicted, one buttress 216 extends out of each corner of plunger body 214 towards the corner of plunger pad 212 at approximately a 45° angle. When viewed from the side, buttresses 216 are triangular in shape, however they are not so limited. Additional buttresses 216 may be positioned between each buttress 216 shown, for additional support. Plunger rod 218 extends outwardly from the rearward end of plunger body 214, approximately at its middle in spaced parallel alignment therewith. A step section 220 is positioned on rod 218 adjacent the rearward end of plunger body 214. Step section 220 is round like rod 218, however step section 220 has a larger diameter than rod 218. Rod 218 terminates in a treaded section at its rearward most end. In one arrangement, the plunger pad 212, plunger body 214, buttress 216, rod 218, step 220 and threaded section 222 described herein are formed from a single piece such as a cast metal, machined metal, or injection molded piece. Alternatively, some of the components are formed from a metallic material, whereas others are formed from injection molded pieces. As one example, rod 218 and/or threaded section 222, or any portion thereof, are formed of a metallic material, whereas the remaining portions, 212, 214, 220, are formed of fiberglass, plastic, composite or any other non-metallic material. Alternatively, threaded end 22 is connected to a smaller shaft which extends into rod 218 and is molded thereto.

Plunger assembly 210 includes a first washer 224 which is positioned over rod 281 and slid forwardly to engage step section 220 at which point its forward progress terminates. Next, spring 226 is positioned over rod 218 followed by retaining washer 228. Thereafter, locking nut 230 is tightened over threaded end 222 thereby holding all components of the plunger assembly 210 together, with some compression on spring 226.

Plunger assembly 210 is positioned within the open interior of housing 194. Plunger assembly 210 is aligned within the open interior of housing 194 such that the flat and square bottom and side edges of plunger body 214 engage the flat and square bottom and side edges of opening 200 in the forward end of housing 194, such that it engages but freely slides thereon. In addition, the bottom half of the outer periphery of retaining washer 228 is retained by or held within collar 204 thereby preventing forward-to-back motion of retaining washer 228. However, with retaining washer 228 locked in position by collar 204, when a force is applied against the plunger pad 212 pushing it backward, plunger pad 212, plunger body 214, buttresses 216, rod 218, step section 220, first washer 224 and locking nut 230 slide rearward while compressing spring 226 between first washer 224 and retaining washer 228.

Cover 232 is positioned over housing 194 to form an open interior between cover 232 and housing 194. Cover 232 is formed of any suitable size and shape. In one arrangement, as is shown, cover 232 has a flat bottom edge 234 which extends around the periphery of cover 194 and engages along its length to the flat top edge 202 of housing 194, thereby generally sealing or closing the interior of housing 194 and cover 232. The top surface 236 of cover 232 arcuately curves outward in a semi-circular fashion along its forward to back length to provide space therein and thereunder for the components housed within the open interior. Cover 232 terminates flat forward and rearward walls 238 adjacent its front and rearward ends. At least one locking member 240 extends downwardly from cover 232 to lock cover 232 to housing 194. In one embodiment, as is shown, a locking member 240 extends downwardly adjacent each corner of cover 232, each having their own snap fit latch 242. Each locking member 240 is positioned to align with snap fit openings 208 of housing 194. In this arrangement, as cover 232 is forced upon housing 194, locking members 240 fit within snap fit openings 208, as the cover is forced downwardly, the locking members 240 deflect inwardly until the snap fit latch 242 passes the bottom edge or ledge of snap fit openings 208 at which point the locking members 240 return to their non-deflected alignment (or snap) with each snap fit latch 242 engaging the bottom edge of snap fit openings 208 of housing 194 thereby holding cover 232 onto housing 194.

Cover 232 also has matching and aligned upper versions of the housing's semi-circular collar 204 and opening 200. That is, cover 232 has a semi-circular collar 244 positioned above and in alignment with the housing's semi-circular collar 204. Cover 232 has an opening 246 positioned above and in alignment with the housing's opening 200. These features of cover 232 align with their mirror-image features in housing 194 and operate in the same manner. Together these features of housing 194 and cover 232 cooperate and clamshell the retaining washer 228 and the plunger body 214 respectively, holding them in place therebetween with the retaining washer 228 locked in position and the plunger body 214 having slidable movement therein.

Button 248 is connected to housing 232. Button 248 is formed of any suitable size and shape. In one arrangement, as is shown, button 248 has a top surface that approximately arcuately matches or aligns with the top surface 236 of cover 232. The top surface 250 of button 248 is roughened or has features therein, such as the elongated raised rectangular features shown, which improve griping and prevents slippage during use. At least one locking member 252 extends downwardly from button 248 to lock button 248 to cover 232. In one embodiment, as is shown, a locking member 252 extends downwardly adjacent each corner of button 248, each having their own snap fit latch 254. Each locking member 252 is positioned to align with snap fit openings 256 of cover 232. In this arrangement, as button 248 is forced upon cover 232, locking members 252 fit within snap fit openings 256, as the button 248 is forced downwardly, the locking members 252 deflect inwardly until the snap fit latch 254 passes the bottom edge or ledge of snap fit openings 256 at which point the locking members 252 return to their non-deflected alignment (or snap) with each snap fit latch 254 engaging the bottom edge of snap fit openings 256 of cover 232 thereby holding button 248 onto cover 232 at its upper position. Locking members 252 prevent button 248 from escaping upwardly from cover 232 when snap fit latches 254 engage cover 232, however, locking members 252 allow the button 248 to be pressed or slide downward At least one leg 260 extends downwardly from the bottom surface of button 248. Leg 260 is formed of any suitable size and shape. In one arrangement, as is shown, a pair of legs 260 are used, each leg 260 extending a distance past the bottom edge of the locking members 252. Legs 260 taper as they extend downwardly; legs 260 generally extend straight downward from button 248 so as to efficiently transfer motion downward when button 248 is pressed. When button 248 is in position on cover 232 installed on housing 194 one leg 260 passes around each lateral side of plunger assembly 210, without direct contact which would prevent plunger assembly 210 from sliding forwardly or backwardly. The bottom end of legs 260 extend through openings in the internal structure of housing 194, namely cross brace 199A, which provide alignment and additional support to legs 260 to ensure they engage at the appropriate position and prevent deflection of legs 260 during use. The bottom end of legs 260 engage the top surface of tooth engaging member 182 approximately above compressible member 190 and between arcuate bend 186 and stop tab 188. In this arrangement, when button 248 is pressed it forces downward on tooth engaging member 184 causing arcuate bend 186 to rotate between cradle 178 of top keeper 170 and pivot point 199B of housing 194 while compressing compressible member 190. In doing so, tab 184 of tooth engaging member 182 is withdrawn upward from engaging the forward face of teeth 144 of ratchet plate 136 which, when removed, allows for free forward and back sliding of housing 194 and plunger assembly 210 on ratchet plate 136. Once pressure is released on button 248, the compressible member 190 again forces upward on recess 192 of tooth engaging member 182 such that tab 184 is forced downward through opening 176 in top keeper 170 until it engages the forward end of teeth 144 of ratchet plate 136. This simultaneously pushes button 248 upwardly until snap fit latches 254 engage the bottom surface of snap fit openings 256.

Side Support Wings: Side support wings 24 are removeably and replaceably connected to the lateral sides 34 of base 12. Side support wings 24 are formed of any suitable size and shape. In one arrangement, as is shown, side support wings 24 are formed in a generally rectangular shape. Side support wings 24 have a generally planar top surface 260 which extends in a generally parallel spaced relation to planar bottom surface or edge 262. Side support wings 24 have opposing front and rear ends 264, which extend in generally parallel spaced relation to one another which connect to opposing lateral sidewalls 266 which extend in generally parallel spaced relation to one another. Front and rear ends 264 and opposing lateral sidewalls 266 extend in generally perpendicular alignment to one another. Also, ends 264 and sidewalls 266 taper slightly inwardly as they extend upward so as to allow for easy removal of side support wings 24 from the mold in which they are formed.

Tail cut sections 268 of a dovetail joint are positioned adjacent approximately the center of the ends 264 of side supports 24. Tail cut sections 268 are designed to be received in corresponding pin cut recesses 54 of a dovetail joint positioned in the sidewall 34 of base 12. Alternatively, the pin cut recesses 54 and tail cut sections 268 swap position with respect to base 12 and side supports 24. Tail cut sections 268 have opposing edges that taper inwardly as they transition from the end 264 towards the center of wing 24 thereby forming an acute angle; and taper inwardly toward one another as they transition from top 260 to bottom 262 of side support 24. In this way, pin cut recesses 54 and tail cut sections 268 serve to firmly and securely hold side supports 24 therein. While a single side support is shown attached to each sidewall 34 of base 12, more than one side support can be stacked in end to end relation (with corresponding tail cut sections 268 and pin cut recesses 54) in engagement of one another to extend support further in end-to-end relation.

Alternatively, while a dovetail joint is shown, any other manner and method of connecting the side supports 24 to base 12 are hereby contemplated for use. In one arrangement, a conventional fastener, such as a screw or bolt is passed between the side support 24 and the base 12, alternatively, a groove is positioned in one of the side support 24 and base 12, and a corresponding protrusion is positioned in the other of the side support and the base 12, thereby connecting and locking the two components together. Alternatively, a locking feature, or snap-fit feature is used in a similar manner, or any other manner of connecting two components together is used.

Side supports 24 have an open interior 270 for the storage of stop collars, screws, drill bits, tools and/or any other object. Open interior 270 is covered by door 272. Door 272 engages side support 24 at one end with hinge 274 approximate the top surface 260 of one sidewall 266 and at an opposite end with latch 276 approximate the top surface 260 of opposing sidewall 266. Latch 276 has a snap feature 278 which frictionally engages a recess 280 in sidewall 266 of side support 24.

Side supports 24 have a plurality of structural features connected to the bottom side or interior of side supports 24 that provide additional strength and rigidity. Specifically, as is shown, side supports 24 have a double wall design, with an exterior wall 266 and an interior wall 282. In addition, side supports 24 are securable to a planar surface, such as a substantially horizontal work surface by any suitable means. In the embodiment shown, side supports 24 have a plurality recessed openings 284 positioned along the periphery or edge of opposing lateral sidewalls 266 through which conventional screws can be inserted for attachment of side supports 24 to a workbench or other planar surface.

Pin: In one embodiment, a locating pin 102 is connected to upright 14. Pin 102 is formed of any suitable size and shape and design. In one arrangement, as is shown, pin 102 has a main body 288 which is generally cylindrical in shape with a first section 290 connected at a step to a second section 292. The first section 290 has a smaller diameter than the second section 292, in addition the first section 290 has a roughened or knurled surface gripping upright 14 or molded within upright 14 or adhered into upright 14 or welded to upright 14. In this arrangement, the knurled surface of first section 290 is pressed into pin opening 75 of upright 14 such that a tight frictional engagement that is permanent is formed between pin 102 and upright 14. Pin 102 is fully inserted into pin opening 75 when the step between first section 290 and second section 292 engages the back side of pin opening 75. Main body 288 has a cylindrical hollow interior 294 with a ring 296 which has a narrower diameter positioned therein adjacent the rearward end of second section 292. Pin 102 has a nose section 298 which includes an elongated shaft 300 having a knurled section 302 adjacent its rearward end and a collar 304, having a larger diameter than elongated shaft 300 is connected adjacent its forward end which terminates in a smaller diameter rounded nose pin 306. A spring 308 is positioned around elongated shaft 300 and is captured between collar 304 on its forward end and ring 296 adjacent its rearward end. Elongated shaft 300 is passed through the hollow interior 294 of main body 288, with its rearward end passing through the narrower diameter of ring 296 and is connected knob 310 by any means such as threading, adhesive, press fit, or the like. In the arrangement shown, knob 310 has an open forward end 312 which is pressed over the rearward end of elongated shaft 300 such that the knurled surface 302 of elongated shaft 300 forms a frictional engagement and permanent fit between knob 310 and elongated shaft 300. Knob 310 has a roughened handle section 314 which is convenient for gripping. In this arrangement, when knob 310 is pulled rearward, the force of spring 308 is overcome which withdraws rounded nose pin 306 from preexisting openings 104 allowing for vertical movement of guide assembly 16. Alternatively, when released, spring 308 forces rounded nose 306 forward and engages preexisting openings 104 in guide assembly 16 stopping vertical movement of guide assembly 16.

Dust Catcher: In one embodiment, a dust catcher 28 is removably and replaceably connected to upright 14. Dust catcher 28 is formed of any suitable size and shape and design. In one arrangement, as is shown, dust catcher is formed of two component parts, a main housing 316 and a snout 318. Main housing 316 connects to the rearward side of upright 14 and is positioned below pin 102 and between opposing vertical sidewalls 58, and between triangular gussets 62. Main housing 316 covers a portion of, or the majority of the rearward side of back wall 66 of upright 14 and covers the exit holes 74 therein so as to capture any chips that are formed during drilling.

Main housing 316 has a generally flush and flat forward surface or edge 320 which engages the rearward side of back wall 66. At least one, and as is shown, an opposing pair of attachment members 322 are connected adjacent edge 320. While attachment members 322 are of any size, shape or design, they are shown as protrusions out of the exterior surface of main housing 316. Attachment members 322 connect to, slide within, snap to, or otherwise attach to receptacles 324 positioned adjacent the rearward side of back wall 66 in the inward faces of vertical sides 58 and/or gusset portions 62. As main housing 316 travels rearward from forward edge 320 it forms a hollow interior space. A cylindrical opening 326 is positioned in the rearward end of main housing 316. Cylindrical opening 326 has a first ring 328 which is positioned forward of a second ring 330 with a step at the intersection of the two rings 328, 330. First ring 328 has a smaller diameter than second ring 330. A recess 332 is positioned in main housing 316 so as to provide clearance around pin 102.

Snout 318 is removeably and replaceably connected to main housing 316. Snout 318 has a flat forward end 334 which is generally circular in shape thereby defining a hollow interior. The exterior diameter of forward end 334 is approximately equivalent to the interior diameter of second ring 330, while the first ring 328 is smaller than the diameter of forward end 334. In this way, forward end 334 fits within the cylindrical opening 326 such that the exterior surface of forward end 334 is received within close tolerances by larger second ring 330, whereas the forward end 334 engages the rearward side of first ring 328, which stops snout 318 from progressing any further into main housing 316. In this position, as both cylindrical opening 326 and forward end 334 of snout 318 are generally cylindrical in nature, snout 318 is able to rotate therein to any angular position which provides additional convenience.

At least one locking member 336 extends outwardly from forward end 334 of snout 318 each having its own snap fit latch 338. Each locking member 336 is positioned to align with and frictionally engage the first ring 328 such that when forward end 334 of snout 318 is positioned within cylindrical opening 326, locking members 336 engage first ring 328 and snap fit latch 338 holds to the forward side of first ring 328 thereby preventing separation of snout 318 from main housing, while allowing snout 318 to rotate within main housing 316. In this arrangement, as forward end 334 is forced into cylindrical opening 326, locking members 336 engage the interior surface of first ring 328 and deflect inwardly until the snap fit latch 338 passes the forward edge of first ring 328 at which point the locking members 336 return to their non-deflected alignment (or snap) with each snap fit latch 338 engaging the forward edge of first ring 328. This arrangement can be reversed, that is the features can be reversed, with a cylindrical tub extending out of the main housing 316 and snapping into a cylindrical opening in snout 318. As is shown, snout 318 is generally tubular in nature and bends at a generally 90° angle and terminates in a round open end suitable for connecting a conventional vacuum cleaner.

Adjustable Stops: At least one adjustable stop 26 is removeably and replaceably connected to base 12 adjacent transition 38 on the flat upper planar work surface 40. Adjustable stops 26 are formed of any suitable size and shape and design. In one arrangement, as is shown, adjustable stops 26 are formed of a main body 340 which is generally square or rectangular in shape with flat and flush sides which extend in generally parallel spaced relation to one another. The bottom surface 342 of stop 26 has at least one key 344 extending outwardly and downwardly therefrom which is sized and shaped to be retainingly received within key holes 55 in planar wok surface 40 of base 12. Key 344 can be any device which attaches one object to another such as a snap fit feature or the like. As is shown, key 344 includes a post 346 which is generally cylindrical in shape connected at its end to head 348, which is generally cylindrical in nature with a larger diameter than post 346. As is shown, in one arrangement, a pair of keys 344 are positioned in alignment along the center of bottom surface 342 of stop 26 which removably and replaceably and lockingly engage the pair of key holes 55 positioned in base. A pair of keys 344 and key holes 55 provide greater support and additional strength and improved alignment over a single key 344. Additional keys 344 and key slots 55 can be used for additional support. Key slots 55 include a detent feature which allows post 346 to pass there through while holding it in place once post 346 passes the detent, and post 346 can be removed by overcoming the force of the detent.

Sidewall 350 of stop 26 includes an aperture 352 extends through main body 340 in parallel spaced alignment from side to side. Aperture 352 is positioned in parallel spaced alignment with the flat planar upper work surface 40 of base 12 and is aligned to extend generally perpendicularly across the lateral width of base 12 when stop 26 is in position on base 12. A stop bolt 354 is threadably passed through aperture 352. In one arrangement stop bolt 354 threadably engages the material of stop 26. Alternatively a nut pocket and corresponding nut 356 are positioned within aperture 352 which provide improved alignment, durability and rigidity, especially when the nut is made of metal and the stop 26 is made of a plastic, composite or other non-metallic material. A threaded stop collar 358 is threadably engaged over stop bolt 354 and is used to set the distance or length stop bolt 354 extends out of stop 26. As is shown, a stop 26 is positioned adjacent each lateral side of base 12 such that a stop 26 can be used on the right side and/or left side of a workpiece.

Insertion of Clamp Follower in Base: Clamp follower 22 is slidably positioned in base 12. Clamp follower 22 is inserted in base 12 by any suitable means or design. In one arrangement, as is shown, base 12 has a clamp follower opening 360 therein. Clamp follower opening 360 is positioned adjacent sidewall 30 and is positioned approximately centrally between lateral sidewalls 34. When viewed from behind sidewall 30, base 12 has a cutout therein which matches the rear profile of ratchet plate 136. That is, base has a ratchet plate cut out portion 362 with a connecting tab cut out portion 364 connected to and positioned below ratchet plate cut out portion 362. These cut outs 362, 364 allow fully assembled clamp follower 22 to slide into base 12. Positioned forwardly thereof, flange 366 extends into opening 360 with a space positioned therebetween. Flange 366 extends in parallel relation to the flat upper planar work surface 40 and has a space 368 positioned directly therebelow. Flange 366 and space 368 matingly and slidingly receive the forward end of ratchet plate 136 with groove 138 fitting within space 368. In this way, ratchet plate is free to slide forward and back within clamp follower opening 360, while flange 366 prevents ratchet plate from separating from base 12 or coming out of opening 360. Once clamp follower 22 is positioned within opening 360 of base 12, second end 135 of rod 110 is attached to connecting tab 146 of ratchet plate 136 by conventional bolt, screw or nut.

In Operation: In operation, upright 14 is attached to base 12 by positioning the bottom surface 68 of upright 14 on the recessed platform 44 of base 12. In this position, upright 14 falls into alignment with edge 46 guiding the periphery of upright 14 into place with through holes 78 of feet 76 aligning through holes 50 of nut pockets 52. Once in position, upright 14 is screwed or bolted to base 12. The removability of upright 14 allows users to install other components in place of upright 14 which allows for added functionality of jig 10.

Guide assembly 16 is inserted into upright 14. In doing so, knob 310 of pin 102 is pulled away from back wall 66 of upright 14. In doing so, the force of spring 308 is overcome which withdraws rounded nose 306 rearwardly until collar 304 engages the forward end of main body 288. In this position, guide assembly 16 is free to slide up and down to the desired position at which point knob 310 is released which causes spring 308 to force rounded nose 306 into the selected preexisting opening 104 thereby locking the vertical motion of guide assembly 16.

Adjustable stop 26 is inserted into base 12 by inserting keys 344 with key holes 55 and pushing stop 26 forward until it is locked in place. In this position, the length of stop bolt 354 is adjusted. Once at its desired length, stop collar 358 is tightened on stop bolt 354 against stop 26 thereby locking the length and position of stop bolt 354.

Dust catcher 28 is inserted on the back of upright 14. The forward edge 320 of main housing 316 is forced against the back side of back wall 66 with recess 332 aligned around pin 102. In this position, attachment members 322 are forced to engage receptacles 324 thereby holding dust catcher 28 to upright 14. In this position, snout 318 is rotated to the desired angular relation. The size and shape of the components, snout 318 and main housing 316 allow for full rotation of snout 318 when installed onto upright 14, this provides easier adjustment of snout 318 without having to remove snout 318 once installed.

Side supports 24 are installed on base 12 by engaging tail cut sections 268 of side supports 24 into pin cut recesses 54 of base 12 until they are fully engaged. When fully engaged the top surface and bottom edge of base 12 and support 24 should be in parallel spaced alignment.

A workpiece 42 is then placed on the upper planar work surface 40 of base 12 between the clamping face of upright 14 and guide assembly 16, and the clamping face of plunger pad 212. In this position, button 248 is depressed which withdraws tab 184 from engagement with teeth 144 of ratchet plate 136 and the housing 194 is slid forward towards workpiece 42 until plunger pad 212 is either engaging workpiece 42 or at the appropriate close distance to workpiece 42 at which point button 248 is released and tab 184 engages teeth 144 again locking the position of housing 194 and plunger assembly 210 in place; alternatively the button 248 does not need to be depressed to move the plunger pad 212 towards the guide assembly 16 (the button 248 only needs to be pressed to move the clamp follower 22 away from the guide assembly 16) and instead the user can simply push the clamp follower towards the workpiece which causes the tooth engaging member 182 to slide over, or ratchet over, the teeth 144 of ratchet plate 136. Next, the user operates handle 112 by pressing it downward which causes second end 135 of rod 110 to be pulled toward upright 14 and guide assembly 16. As second end 135 of rod 110 is connected to clamp follower 22 by connecting tab 146, clamp follower 22 is pulled toward workpiece 42. When pad 212 engages workpiece 42, workpiece 42 is forced against upright 14 and guide assembly 16. Once all the slack is consumed by the forward motion of guide assembly 22, spring 226 of plunger assembly 210 begins to compress and plunger body 214 begins to slide into housing 194. The further plunger body 214 retracts into housing 194 the greater the compressive force is between clamp follower and upright 14. Spring 226 continues to compress until handle 112 is at its full downward position with the top surface of torsion arm 124 engaging the bottom side of rod 110. At this position, workpiece 42 is firmly held in place by the compressive force of spring 226 at which point pocket holes can be drilled into the workpiece 42.

To release the workpiece 42, the handle 112 is raised and the opposite process occurs. To adjust the position of clamp follower 22 for larger workpieces 42, the button 248 is depressed which causes the tooth engaging member 182 to withdraw from the teeth 144 of ratchet plate 136, which allows for sliding of the clamp follower 22 in the opposite direction. Once the button 248 is released, the tooth engaging member 182 again engages teeth 144 of ratchet plate 136 thereby preventing, once again, the rearward movement of the clamp follower 22.

In one arrangement, a quick and consistent manner of using the pocket hole jig 10 to consistently clamp workpieces 42 of various thickness with the same compressive force is to start with the pocket hole jig 10 with the handle 112 in the up position and the clamp follower 22 all the way back (or away from the guide assembly 16 and upright 14), next a workpiece 42 is placed against the upright 14 and guide assembly 16, next the user pushes the clamp follower 22 until the plunger pad 212 engages, or almost engages the workpiece, or softly engages the workpiece 42, next the user lowers the handle 112. In this way, workpieces 42 of various thickness can be easily, quickly and repeatably clamped with consistent compressive forces.

Method Of Setting A Pocket Hole Drill Stop Collar: Drill setting guide 400 and method is presented. Drill setting guide 400 is formed of any suitable size and shape and design. In one arrangement, as is shown, drill setting guide 400 has a flat and flush bottom surface 402 such that it can be positioned on the flat upper work surface 40 of base 12 adjacent upright. Drill setting guide 400 has a plurality of indicia 404 thereon which correspond to a plurality of common screw lengths used in pocket hole joinery. These indicia 404, as examples, are broken down into four categories. First category is for screws that are ¾". The second category is for screws that are 1", 1¼" and 1½". The third category is for screws that are 2". The forth category is for screws that are 2½". Each of these categories are associated with a different platform 406 which raises a different distance above bottom surface 402. More specifically, the platform 406 for the first category for ¾" screws is the shortest, with the platform 406 for the second category for 1", 1¼" and 1½" screws being a distance taller, with the platform 406 for the third category for 2" screws being a distance taller, with the platform 406 for the fourth category for 2½" screws being the tallest. The top surface of platforms 406 are positioned in an angled relation to bottom surface 402. The top surface of platforms 406 are positioned in approximate perpendicular alignment to the drill guide bores of guide assembly 116 when drill setting guide 400 is positioned flatly on the flat upper work surface 40 of base 12. A hole 408 is positioned in each platform 404 which is sized and shaped to receive the stepped portion of a stepped drill bit 408 (not shown), while the non-stepped portion of the drill bit engages the top surface of platform 406.

Using this new drill setting guide 400, the length of stepped drill bit 410 is set by first setting the guide assembly 16 to the proper height by using indicia 412 on guide assembly 16. The proper height of guide assembly 16 is selected based on workpiece 42 thickness. That is, if the workpiece being drilled is ¾" thick, the guide assembly is set at ¾" (as is shown in the figures). Next, the appropriate platform 406 is selected based on the length of screw being used. That is, if a 2" screw is being used, the platform 406 associated with the 2" indicia 404 is selected and is positioned in front of a selected guide channel 92. Once in position, stepped drill bit 410 is dropped into the selected guide channel 92 at which point the stepped portion of the drill bit 410 is received in hole 408 and the non-stepped portion of drill bit 41 engages platform 406 thereby stopping the drill bits downward progression. At this point, stop collar 414 is slid over the shank of stepped drill bit 410 until it engages the stop flange 98 of guide assembly 16 at which it is tightened thereon using locking screw 416. In this way, the depth of a stepped drill bit 410 is set based only upon workpiece 42 thickness and the length of screws used.

Method of Setting a Pocket Hole Drill Stop Collar:

In one method of operation, a workpiece 42 of any thickness is quickly tightened in place using the following steps. Initially, the jig 10 starts in a fully open position, with the clamp follower 22 being positioned all the way back or away from the upright assembly 14, this can be accomplished by pressing the button 248 on the clamp follower 22 and sliding the clamp follower 22 rearward to a fully open position. Next, a workpiece 42 is positioned on the base 12 between the plunger pad 212 of the clamp follower 22 and the upright 14. Next, the handle assembly 112 is actuated, or rotated all the way down, to a closed position. This pulls the clamp follower 22 towards the workpiece 42 through the rod 110 positioned within the base 12. Next, the user slides the clamp follower 22 over the ratchet teeth 144 such that the plunger pad 212 engages the workpiece 42 and forces the workpiece 42 into frictional engagement between upright 14 and plunger pad 212 of the clamp follower 22. This sets that width between plunger pad 212 and upright 14 to the thickness of the workpiece 42. Next, the user raises the handle 112 while holding the clamp follower 22 in place, this causes additional ratchets 144 to pass under housing 194, top keeper 170 and tooth engaging member 182. In one arrangement, a functional number of teeth 144 include two, or two clicks, however one tooth 144 or three teeth 144 or more pass under these components to provide the appropriate amount of compression and frictional engagement. This sets the distance between plunger pad 212 and upright 14 to be narrower than workpiece 42 thickness. Next, the user fully lowers the handle 112 which forces clamp follower 22 forward and forces plunger pad 212 into tight frictional engagement with the workpiece 42 being tightly engaged between the upright 14 and the clamp follower 22. This causes the spring 226 of the plunger assembly 210 to compress. In this way a workpiece 42 is quickly and tightly held in place using the ratcheting drilling jig 10.

Accordingly, from the above discussion it will be appreciated that the ratcheting quick-adjust pocket hole jig presented offers many advantages over the prior art.

It will be appreciated by those skilled in the art that other various modifications could be made to the device without parting from the spirit and scope of this invention. All such modifications and changes fall within the scope of the claims and are intended to be covered thereby.

What is claimed:

1. A drilling jig system, comprising:
   a base;
   an upright;
   the upright operably connected to the base;
   a drill guide assembly;
   the drill guide assembly operably connected to the upright;
   the drill guide assembly having at least one drill guide bore;
   wherein the drill guide assembly is movable to adjust for workpiece thickness;
   a drill setting guide;
   the drill setting guide having a plurality of platforms;
   each of the plurality of platforms having a height associated with a workpiece thickness;
   a drill bit;
   the drill bit having a shaft, a tip and a stop collar;
   wherein the drill setting guide and the drill guide assembly are configured to facilitate setting drilling depth for a first workpiece thickness by:
   adjusting the position of the drill guide assembly to a position associated with the first workpiece thickness;
   placing a first platform of the drill setting guide associated with the first workpiece thickness in alignment with a first drill guide bore of the drill guide assembly;
   inserting the drill bit into the first drill guide bore of the drill guide assembly until the tip of the drill bit engages the first platform;
   tightening the stop collar to the shaft of the drill bit.

2. The drilling jig system of 1, wherein each of the plurality of platforms of the drill setting guide have a height associated with a screw length.

3. The drilling jig system of 1, wherein the drill setting guide has a structure characterized in that when the drill bit is inserted into the first drill guide bore, the tip of the drill bit engages the first platform.

4. The drilling jig system of 1, wherein the drill setting guide has a structure characterized in that when the drill bit is inserted into the first drill guide bore, the tip of the drill bit engages the first platform and the stop collar engages an upper surface of the drill guide assembly.

5. The drilling jig system of 1, wherein each of the plurality of platforms of the drill setting guide has a height associated with common workpiece thickness.

6. The drilling jig system of 1, wherein the drill setting guide has a second platform with a second height corresponding to a second workpiece thickness, a third platform with a third height corresponding to a third workpiece thickness, and a fourth platform with a fourth height corresponding to a fourth workpiece thickness.

7. The drilling jig system of 1, wherein the drill setting guide has a second platform with a second height corresponding to a second screw length, a third platform with a third height corresponding to a third screw length, and a fourth platform with a fourth height corresponding to a fourth screw length.

8. The drilling jig system of 1, further comprising:
   each of the plurality of platforms having an opening;
   the drill bit having a stepped portion;
   the drill bit having a non-stepped portion; and
   wherein the drill setting guide has a structure characterized in that when the drill bit is extended through the first drilling guide the drill guide assembly, the stepped portion of the drill bit extends through the opening of the selected platform.

9. The drilling jig system of 1, wherein the drill guide assembly has indicia corresponding to workpiece thickness.

10. The drilling jig system of 1, wherein the plurality of platforms of the drill setting guide has indicia corresponding to workpiece thickness.

11. The drilling jig system of 1, wherein the plurality of platforms of the drill setting guide has indicia corresponding to screw length.

12. A drilling jig system, comprising:
    a base;
    an upright;
    the upright operably connected to the base;
    a drill guide assembly;
    the drill guide assembly operably connected to the upright;
    the drill guide assembly having a drill guide bore;
    a clamp assembly;
    the clamp assembly operably connected to the base;
    a drill setting guide;
    the drill setting guide having a plurality of platforms;
    each of the plurality of platforms having a height associated with a workpiece thickness;
    a drill bit;
    the drill bit having a shaft, a tip, and a stop collar;
    wherein the drill setting guide and the drill guide assembly are configured to facilitate setting drilling depth for a desired workpiece thickness by placing the drill setting guide on the base and in alignment with the drill guide bore of the drill guide assembly;
    inserting the drill bit into the drill guide bore of the drill guide assembly until the drill bit engages a surface of one of the plurality of platforms of the drill setting guide corresponding to the desired workpiece thickness;
    tightening the stop collar onto the drill bit.

13. The system of 12, wherein the plurality of platforms of the drill setting guide each correspond to different screw lengths.

14. The system of 12, wherein the plurality of platforms of the drill setting guide each correspond to different workpiece thicknesses.

15. The system of 12, wherein each of the plurality of platforms of the drill setting guide has a height which is different from the height of any other one of the plurality of platforms.

16. The system of 12, wherein the drill setting guide has a first platform with a first height corresponding to a first workpiece thickness, a second platform with a second height corresponding to a second workpiece thickness, a third platform with a third height corresponding to a third workpiece thickness, and a fourth platform with a fourth height corresponding to a fourth workpiece thickness.

17. The system of 12, wherein the drill setting guide has a first platform with a first height corresponding to a first screw length, a second platform with a second height corresponding to a second screw length, a third platform with a third height corresponding to a third screw length, and a fourth platform with a fourth height corresponding to a fourth screw length.

18. The system of 12, further comprising:
    each of the plurality of platforms having an opening;
    the drill bit having a stepped portion;
    the drill bit having a non-stepped portion; and wherein when the drill bit is extended through the drill guide bore of the drill guide assembly, the stepped portion of the drill bit extends through the opening of a selected one of the plurality of platforms and the non-stepped portion engages an upper surface of the selected one of the plurality of platforms.

19. The system of 12, wherein the height of the drill guide assembly is adjustable to conform to workpiece thickness.

20. The system of 12, wherein the drill guide assembly has indicia corresponding to workpiece thickness.

21. The system of 12, wherein each of the plurality of platforms have indica corresponding to a screw length.

22. The system of 12, wherein each of the plurality of platforms have a indicia corresponding to a workpiece thickness.

23. A method of setting a drilling depth for a desired workpiece thickness using a stop collar, comprising:
providing a base with an upright and a clamp assembly operably connected thereto;
operably connecting a drill guide assembly having a first drill guide bore to the upright;
providing a drill setting guide with a plurality of platforms corresponding to different workpiece thicknesses;
setting the drilling depth for the desired workpiece thickness by:
placing the drill setting guide onto the base such that a first platform of the plurality of platforms corresponding to the desired workpiece thickness is in alignment with the first drill guide bore in the drill guide assembly;
inserting a drill bit into the first drill guide bore of the drill guide assembly until it engages the first platform of the plurality of platforms;
lowering a stop collar onto the drill bit until it engages the drill guide assembly; and
tightening the stop collar around the drill bit thereby setting a drilling depth.

24. The method of 23, further comprising:
providing indicia on each of the plurality of platforms corresponding to a screw length.

25. The method of 23, further comprising:
providing indicia on each of the plurality of platforms corresponding to a workpiece thickness.

26. The method of 23, further comprising:
providing indicia on the drill guide assembly corresponding to workpiece thicknesses.

27. The method of 23, further comprising:
adjusting the height of the drill guide assembly to correspond to a workpiece thickness.

28. The method of 23, wherein the stop collar is tightened around the drill bit using a locking screw.

29. A method of setting a drilling depth using a stop collar, comprising:
providing a base with an upright and a clamp assembly;
operably connecting a drill guide assembly with a first drill guide bore to the upright;
providing a drill setting guide with at least a first platform having a first height and a second platform having a second height;
placing the drill setting guide onto the base such that one of the first platform or the second platform is aligned with the first drill guide bore in the drill guide assembly;
inserting a drill bit into the first drill guide bore of the drill guide assembly until it engages one of the first platform or the second platform;
lowering a stop collar onto the drill bit until it engages the drill guide assembly;
tightening the stop collar around the drill bit, thereby facilitating locked engagement of the stop collar to the drill bit and setting a drilling depth.

30. The method of 29, further comprising the drill setting guide having indicia corresponding to screw length.

31. The method of 29, further comprising the drill setting guide having indicia corresponding to workpiece thickness.

32. The method of 29, wherein the first height corresponds to a first screw length and the second height corresponds to a second screw length.

33. The method of 29, wherein the first height corresponds to a first workpiece thickness and the second height corresponds to a second workpiece thickness.

34. The method of 29, further comprising:
adjusting the height of the drill guide assembly to correspond to workpiece thickness.

35. The method of 29, further comprising:
providing a third platform having a third height;
providing a fourth platform having a fourth height; and
placing the drill setting guide onto the base such that one of the first platform, the second platform, the third platform, or the fourth platform is in alignment with the first drill guide bore in the drill guide assembly.

36. A drilling jig system, comprising:
a base;
an upright;
the upright operably connected to the base;
a drill guide assembly;
the drill guide assembly operably connected to the upright;
the drill guide assembly having a first drill guide bore;
wherein the drill guide assembly is movable to adjust for workpiece thickness;
a drill setting guide;
the drill setting guide having a plurality of platforms;
wherein each of the plurality of platforms have a corresponding height associated with a workpiece thickness;
a drill bit;
the drill bit having a shaft, a tip and a stop collar;
wherein the drill setting guide and the drill guide assembly are configured to facilitate setting drilling depth for a first workpiece thickness by:
placing a first platform of the plurality of platforms that corresponds with the first workpiece thickness in alignment with a first drill guide bore of the drill guide assembly;
inserting the drill bit through the first drill guide bore of drill guide assembly until the tip of the drill bit engages the first platform; and
tightening the stop collar in place on the drill bit.

37. The system of 36, wherein each of the plurality of platforms of the drill setting guide each have a height associated with a screw length.

38. The system of 36, wherein each of the plurality of platforms of the drill setting guide each have a height associated with a workpiece thickness.

39. The system of 36, wherein each of the plurality of platforms of the drill setting guide has a height associated with common workpiece thicknesses.

40. The system of 36, further comprising:
each of the plurality of platforms having an opening;
the drill bit having a stepped portion;
the drill bit having a non-stepped portion;

wherein the opening of each of the plurality of platforms is configured to receive the stepped portion of the drill bit.

41. The system of 36, wherein the guide assembly has indicia corresponding to workpiece thicknesses.

42. The system of 36, wherein the plurality of platforms of the drill setting guide have indicia corresponding to workpiece thicknesses.

43. The system of 36, wherein the plurality of platforms of the drill setting guide have a indicia corresponding to screw length.

44. A system for setting the position of a stop collar on a drill bit for drilling pocket holes with a drilling jig system, the system comprising:
    a drill setting guide;
    the drill setting guide having a plurality of platforms;
    wherein each of the plurality of platforms have an upper surface;
    wherein each of the plurality of platforms have a height;
    wherein the height of the upper surface of each of the plurality of platforms is associated with a respective workpiece thickness,
    wherein the drill setting guide and the drilling jig system are configured to facilitate setting drilling depth for a desired workpiece thickness by:
        placing a first platform of the plurality of platforms of the drill setting guide that is associated with the desired workpiece thickness in alignment with a drill guide bore of the drill guide assembly;
        inserting the drill bit into the first guide bore of the drill guide assembly until the tip of the drill bit engages the first platform;
        tightening the stop collar to the shaft of the drill bit.

45. The system of 44, wherein each of the plurality of platforms has indicia associated with the height of the platform.

46. The system of 44, wherein each of the plurality of platforms has indicia associated with associated screw length.

47. The system of 44, wherein each of the plurality of platforms has indicia associated with the associated workpiece thickness.

48. The system of 44, wherein each of the plurality of platforms has a hole therein wherein the hole is configured to receive a steppe portion of a tip of a drill bit.

49. The system of 44, wherein the position of the stop collar is set on the drill bit by:
    selecting a first platform of the plurality of platforms of the drill setting guide that is associated with a first workpiece thickness;
    inserting the drill bit through a drill guide bore of a pocket hole jig until a tip of the drill bit engages the first platform;
    tightening the stop collar onto the shaft of the drill bit.

* * * * *